United States Patent
Ausserlechner

(10) Patent No.: US 10,684,141 B2
(45) Date of Patent: Jun. 16, 2020

(54) MAGNETIC ANGLE SENSOR DEVICE AND METHOD OF OPERATION

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 268 days.

(21) Appl. No.: 15/715,302

(22) Filed: Sep. 26, 2017

(65) Prior Publication Data

US 2018/0087926 A1 Mar. 29, 2018

(30) Foreign Application Priority Data

Sep. 28, 2016 (DE) .................. 10 2016 118 376

(51) Int. Cl.
*G01D 5/14* (2006.01)
*G01D 5/165* (2006.01)
*G01D 5/245* (2006.01)

(52) U.S. Cl.
CPC ............. *G01D 5/145* (2013.01); *G01D 5/165* (2013.01); *G01D 5/245* (2013.01)

(58) Field of Classification Search
CPC ... G01B 7/00; G01B 7/14; G01B 7/30; G01R 33/02
See application file for complete search history.

(56) References Cited

U.S. PATENT DOCUMENTS

| | | | | |
|---|---|---|---|---|
| 6,064,197 A | * | 5/2000 | Lochmann | G01B 7/30 324/207.14 |
| 2014/0191625 A1 | * | 7/2014 | Kitamoto | G01D 3/08 310/68 B |
| 2018/0172423 A1 | * | 6/2018 | Ausserlechner | G01D 5/145 |

FOREIGN PATENT DOCUMENTS

| | | |
|---|---|---|
| DE | 10133542 A1 | 2/2002 |
| DE | 60131245 T2 | 8/2008 |
| DE | 102008051479 A1 | 3/2010 |
| DE | 102011080679 A1 | 4/2012 |
| WO | WO-2016098627 A1 | 6/2016 |

\* cited by examiner

*Primary Examiner* — Tung X Nguyen

(74) *Attorney, Agent, or Firm* — Schiff Hardin LLP

(57) ABSTRACT

A magnetic angle sensor device is suggested comprising a shaft that is arranged rotatably around a rotation axis, at least one permanent magnet, a stator and two magnetic angle sensors, which are fixed to the stator, wherein the shaft is arranged rotatably against the stator, wherein the at least one permanent magnet is connected to the shaft, and wherein the at least one permanent magnet is arranged to apply magnetic fields at the two magnetic angle sensors with different directions of diametrical magnetic field components.

26 Claims, 16 Drawing Sheets

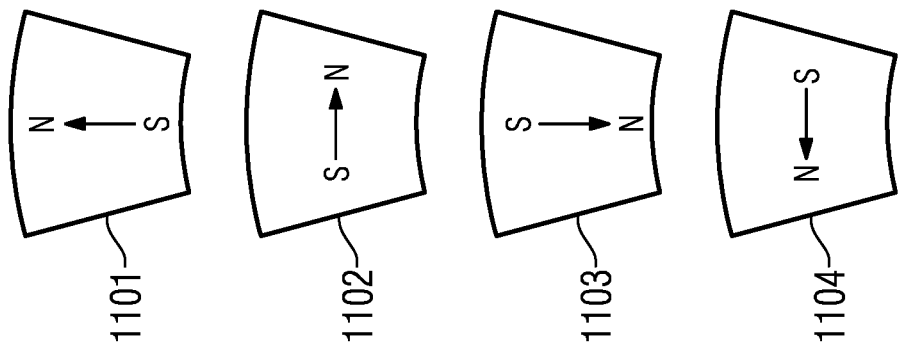
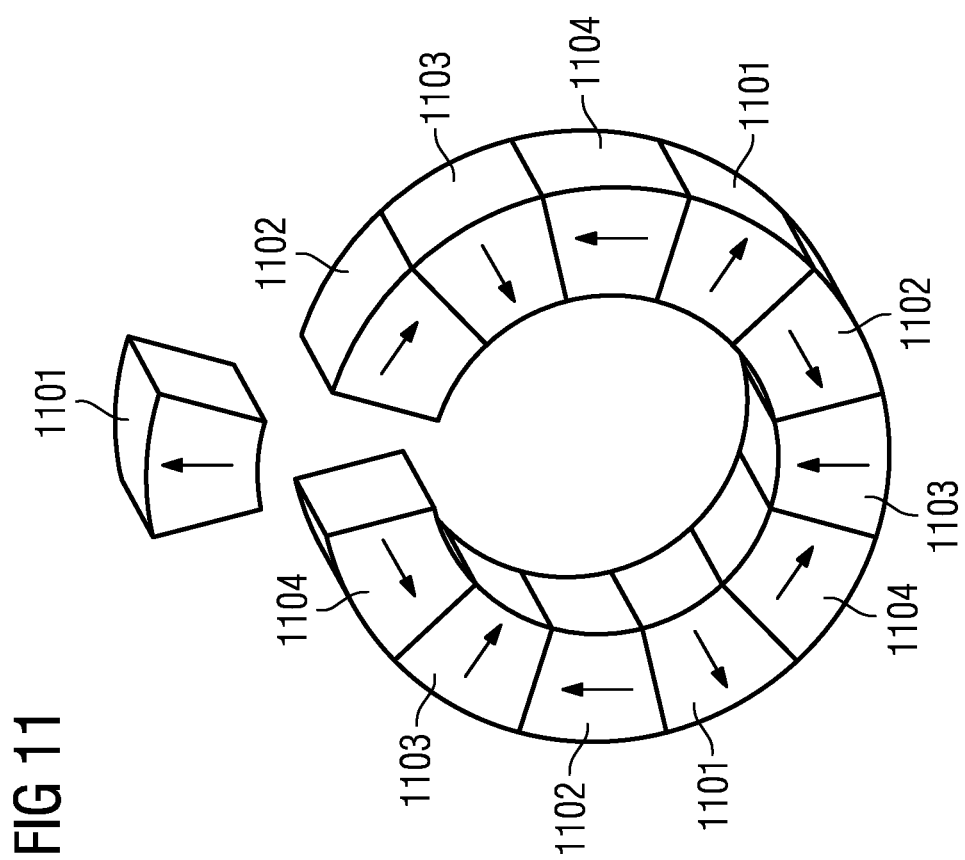
FIG 11

FIG 13
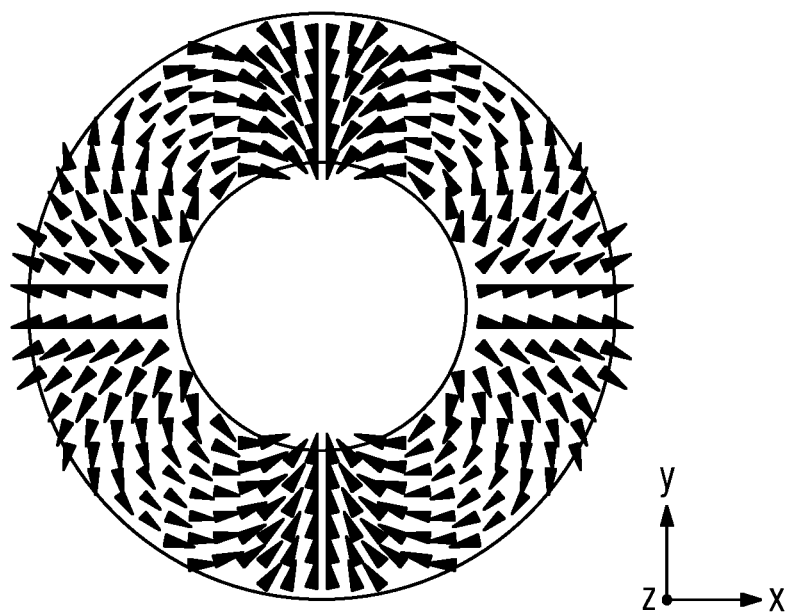
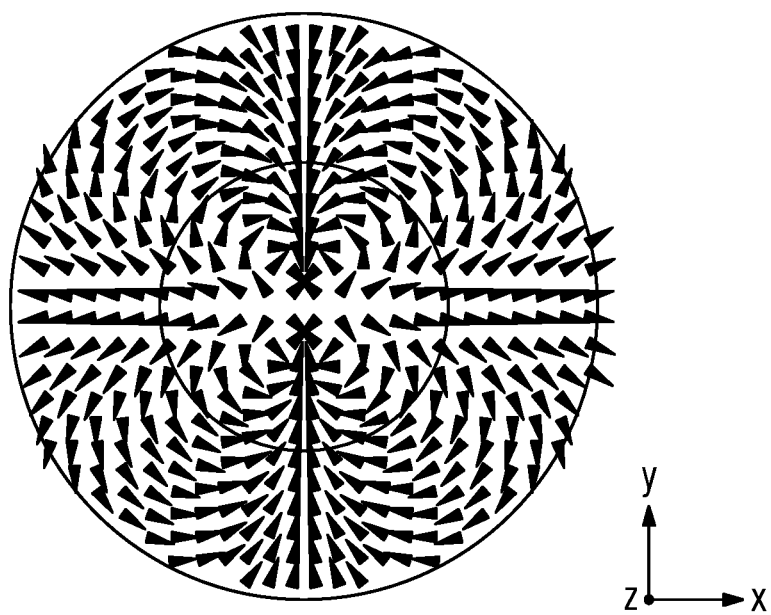

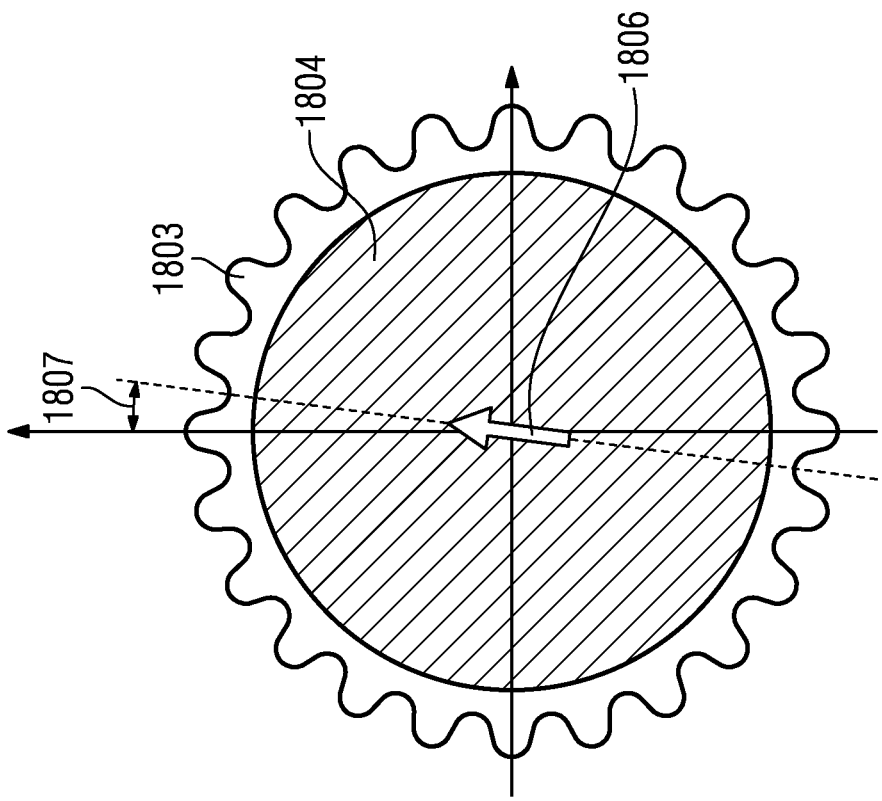
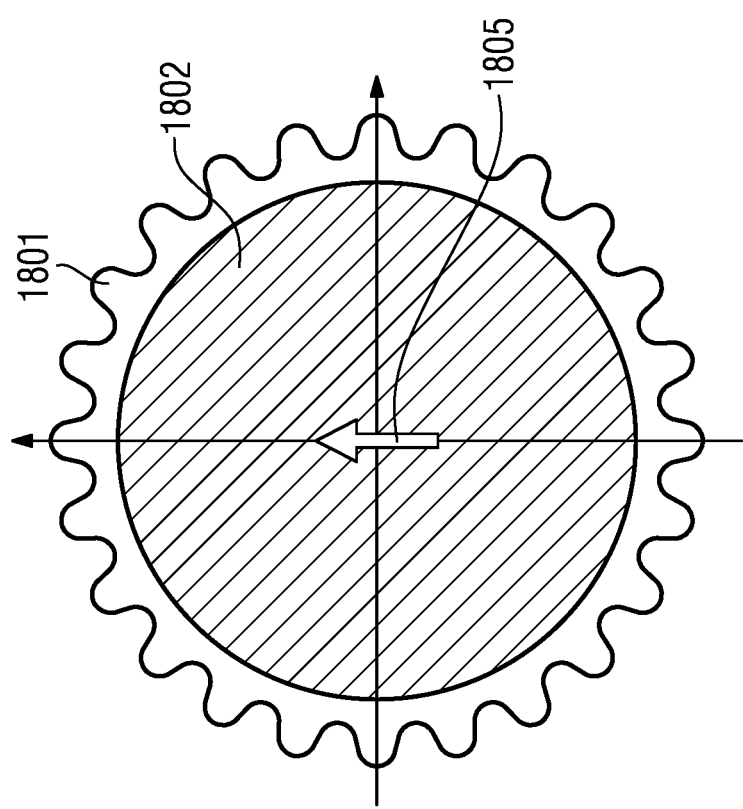
FIG 18

MAGNETIC ANGLE SENSOR DEVICE AND METHOD OF OPERATION

BACKGROUND OF THE INVENTION

Embodiments of the present invention relate to a magnetic angle sensor arrangement that allows determining a rotational position or movement of a shaft.

SUMMARY

A first embodiment relates to a magnetic angle sensor device comprising
- a shaft that is arranged rotatably around a rotation axis,
- at least one permanent magnet,
- a stator,
- two magnetic angle sensors, which are fixed to the stator,
- wherein the shaft is arranged rotatably against the stator,
- wherein the at least one permanent magnet is connected to the shaft,
- wherein the at least one permanent magnet is arranged to apply magnetic fields at the two magnetic angle sensors with different directions of diametrical magnetic field components.

A second embodiment relates to a method for determining a shaft rotation for a device comprising
- a shaft that is arranged rotatably around a rotation axis,
- at least one permanent magnet,
- a stator,
- two magnetic angle sensors, which are fixed to the stator,
- wherein the shaft is arranged rotatably against the stator,
- wherein the at least one permanent magnet is connected to the shaft,
- wherein the at least one permanent magnet is arranged to apply magnetic fields at the two magnetic angle sensors with different directions of diametrical magnetic field components,
- wherein the method comprises: combining output signals of the two magnetic angle sensors to a total output signal that determines a rotation of the shaft, wherein each of the two magnetic angle sensors provides an output signal comprising an azimuthal angle of the diametrical magnetic field component that impacts the respective magnetic angle sensor.

A third embodiment relates to a computer program product directly loadable into a memory of a digital processing device, comprising software code portions for performing the steps of the method as described herein.

A fourth embodiment relates to a computer-readable medium, e.g., storage of any kind, having computer-executable instructions adapted to cause a computer system to perform the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 11 shows an exemplary embodiment of a ring magnet;

FIG. 13 shows magnetization patterns for rings and cylinders.

FIG. 18 shows an exemplary diagram comprising two toothed wheels, which are coupled via a toothed wheel that is attached to a shaft (similar to the embodiment depicted in FIG. 16);

DETAILED DESCRIPTION OF THE PREFERRED EMBODIMENTS

Examples described herein in particular refer to magnetic angle sensors, wherein a sensor element or sensor chip (also referred to as sensor) can be placed on the rotation axis or off the rotation axis.

Various sensors can be used, e.g., an anisotropic magneto-resistor (AMR), a giant magneto-resistor (GMR), a tunneling magneto-resistor (TMR), Hall-effect devices (e.g., Hall plates, vertical Hall-effect devices) or MAG-FETs (e.g., split-drain MAG-FETs).

Magnets of short, long cylinders and blocks (parallel epipeds) are known as well as magnets formed as cylindrical rings. The sensor elements may be placed, e.g., inside such cylindrical ring or on one side (top or bottom surface) of the cylinder or block magnet.

Magnets may have a diametrical magnetization, wherein the magnetization inside the magnets is substantially homogeneous and points in a single direction perpendicular to a rotation axis. Also, axially magnetized quadrupoles are known, where the magnet is split in a left and a right part with the rotation axis at the interface between both parts, wherein both parts are magnetized in axial directions but anti-parallel. Moreover, arc-shaped magnetization is known as a mixture of diametrical magnetization and axially magnetized quadrupoles.

It is one exemplary object of the approach described herein to provide a magnetic angle sensor, with at least one magnetic sensor that is placed at or on the rotation axis, and which is robust against assembly tolerances and against background magnetic field disturbances. It is further an objective that the magneto-resistive angle sensors or Vertical Hall effect devices may be used. Also, the solution presented may be applicable for off-axis sensors as well. Both scenarios will be described hereinafter.

The approach presented bears in particular the advantage that it is robust against mismatch errors in the assembly of the sensor system and against background fields.

EXAMPLE

Sensor-Dome with Two Magnetic Angle Sensors

An exemplary solution described herein uses at least two angle sensors to which magnetic fields in different directions are applied. The difference in directions may preferably be as large as possible, in particular in the order of 180°. However, the magnetic field directions may also differ by 150°, 120°, 90°, 45°, etc.

Figure 1:
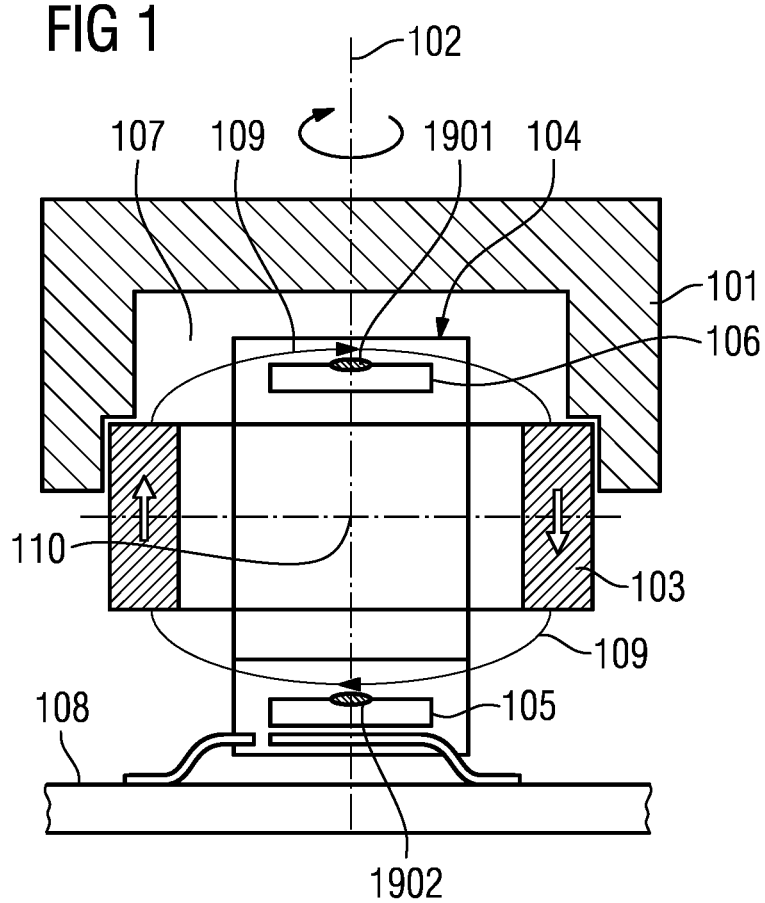
FIG. 1 shows an exemplary embodiment of a sensor system comprising a shaft that rotates around a rotation axis, wherein a ring magnet is attached to the shaft and rotates around a sensor dome comprising two magnetic angle sensors.

FIG. 1 shows an exemplary embodiment of a sensor system comprising a shaft 101 that rotates around a rotation axis 102. A ring magnet 103 is attached to the shaft 101 and it is arranged around the rotation axis 102.

A sensor dome 104 is a cylindrical structure comprising a sensor chip 106 on or in the vicinity of the top surface of the cylindrical structure and a sensor chip 105 on or in the vicinity of the bottom surface of the cylindrical structure. The sensor chips 105, 106 may be embedded in the cylindrical structure or placed on its surface. It is noted that "top" and "bottom" are used for illustration purposes only in order to address the positions of the different surfaces of the sensor dome 104: In the exemplary FIG. 1, the sensor chip 106 is near the top and the sensor chip 105 is near the bottom of the sensor dome 104. However, the sensor dome 104 may be arranged in different orientations depending on the respective use case scenario.

The sensor chip 105 comprises a magnetic sensor element 1902 and the sensor chip 106 may comprise a magnetic sensor element 1901. Each of the sensor chips 105, 106 may comprise at least one magnetic sensor element.

The sensor dome 104 is arranged such that it protrudes into a recess 107 of the shaft 101. The ring magnet 103 surrounds the sensor dome 104, wherein the sensor chip 106 extends beyond the ring magnet 103 into the recess 107 and the sensor chip 105 is arranged such that it has not entered the ring magnet 103. In the orientation used in FIG. 1, the sensor chip 106 is above the ring magnet 103 and the sensor chip 105 is below the ring magnet 103. A center 110 of the ring magnet 103 and the magnetic sensor elements of the sensor chips 105, 106 may be located on the rotation axis 102. The center 110 of the ring magnet 103 may be substantially equally distanced from the magnetic sensor elements of the sensor chips 105, 106.

The sensor chips 105, 106 are connected to a component board 108. This may be achieved by mounting the sensor dome 104 onto the component board 108 and electrically connecting the sensor chips 105, 106 via the sensor dome 104 to the component board 108.

The ring magnet 103 has a magnetization indicated by the arrows in its cut faces. This magnetization leads to a magnetic field 109 affecting the sensor chips 105 and 106. Due to the anti-parallel direction of magnetization in the left and right halves of the magnet 103 the magnetic field 109 acting on the sensor element(s) on sensor chip 106 and acting on the sensor element(s) on sensor chip 105 has an impact in opposite directions.

As indicated, the sensor dome 104 may be arranged such that its symmetry axis lies in the rotation axis 102 such that the shaft 101 and ring magnet 103 rotate substantially symmetrically around the sensor dome 104. The sensor elements of the sensor chips 105, 106 may be arranged such that they also lie in the rotation axis 102.

The hole of the ring magnet 103 is large enough to allow inserting the sensor dome 104. The sensor dome 104 is in particular slim enough to fit into the bore or the ring magnet 103 without colliding. The sensor dome 104 is inserted into the hole of the ring magnet 103 from the opposite side of where the shaft 101 is.

The ring magnet 103 may have an inner diameter of 10 mm, an outer diameter of 14 mm and an axial thickness of 3 mm. The material may be isotropic or anisotropic, sintered, pressed or injection molded hard-magnetic ferrite or rare earth (NdFeB or SmCo with various stoichiometric compositions).

Ring Magnet as Axial Quadrupole

Figure 2:
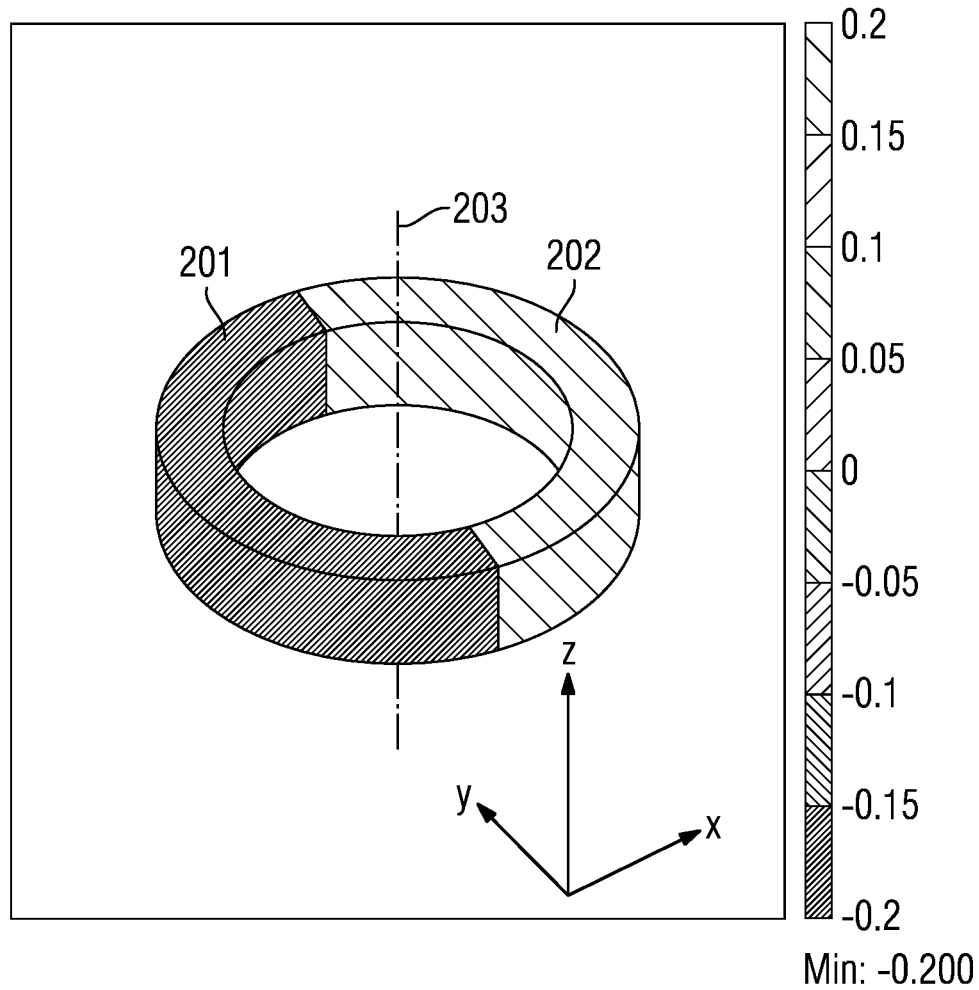
FIG. 2 shows a ring magnet that is realized as an axial quadrupole.

FIG. 2 shows the ring magnet used in the system of FIG. 1. This magnet is an axially magnetized quadrupole, i.e. the half 201 of the ring magnet is magnetized in negative z-direction and the half 202 of the ring magnet is magnetized in positive z-direction. Hence, the magnetic field at a symmetry axis 203 above the center of the ring magnet is antiparallel to the field on the symmetry axis 203 below the center of the ring magnet.

The ring magnet 103 may be such an axial quadrupole as shown in FIG. 2. Thus, the sensor chip 106 is placed above the center of the ring magnet 103 and the sensor chip 105 is placed below the center of the ring magnet 103 as shown in and described with regard to FIG. 1.

The ring magnet shown in FIG. 2 may be obtained by homogeneously magnetizing a ring in positive z-direction, cutting the ring in half, flipping one half and re-connecting both halves of the ring.

As an alternative, each half of the ring can be magnetized simultaneously or sequentially in the gap between jokes of a strong electro-magnet, whereby a slim region between the two regions with magnetization in +/−z directions may be non-magnetized or there the magnetization is diametrical. Diametrical magnetization can be minimized if the magnet material is anisotropic with the easy axis being parallel to the z-direction.

EXAMPLE

Magnetic Field Vectors $B_1$ and $B_2$ are Anti-Parallel

Figure 19:
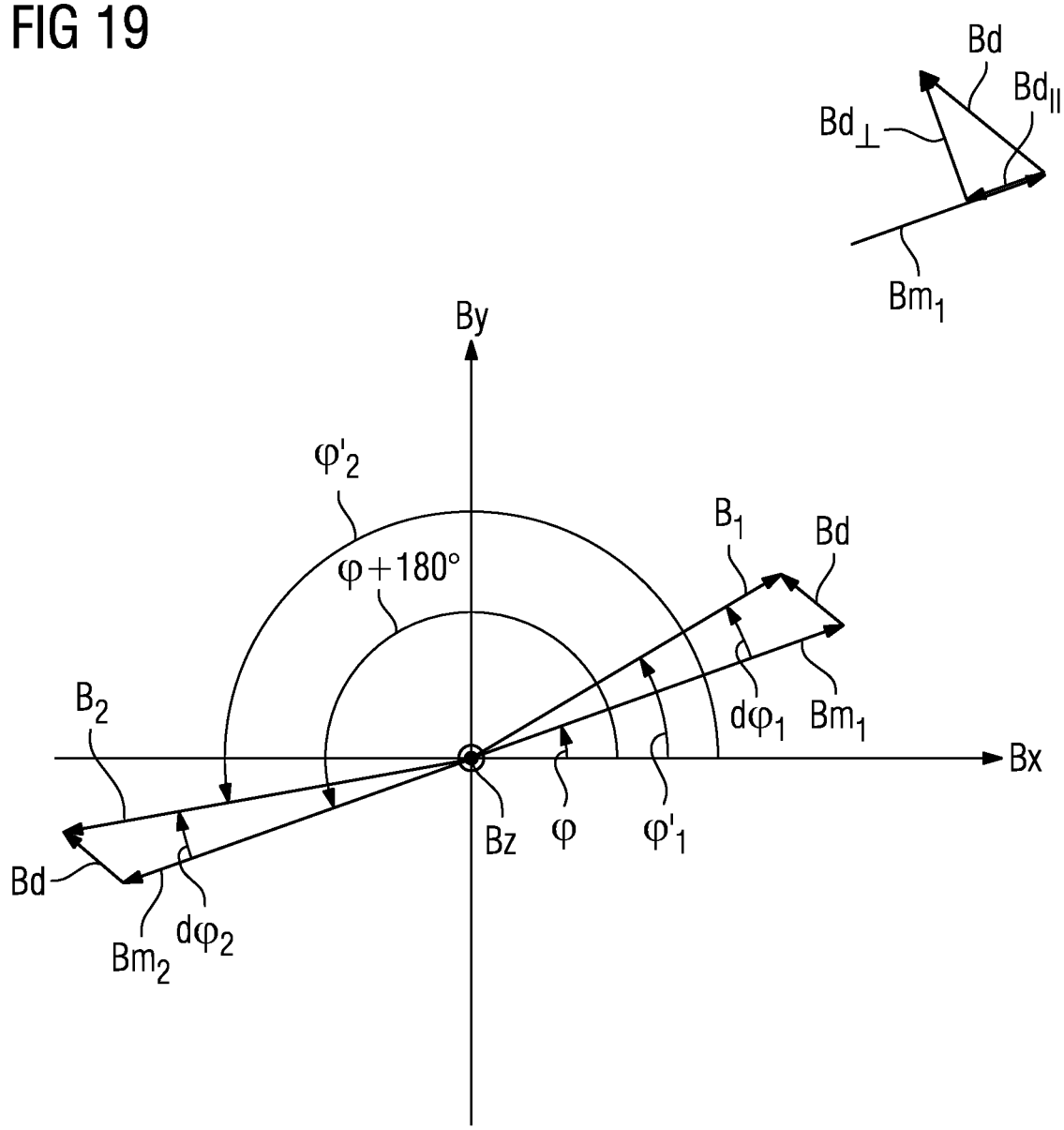
FIG. 19 shows a schematic diagram illustrating the effects that lead to a cancellation of background magnetic fields.

FIG. 19 shows a schematic diagram illustrating the effects that lead to a cancellation of angle errors caused by background magnetic fields.

Two sensor elements 1901 and 1902 are arranged as shown in FIG. 1. The sensor elements can also be referred to as magnetic sensors or magnetic sensor elements. FIG. 19 shows a magnetic field $Bm_1$ that is applied to the sensor element 1901 and a magnetic field $Bm_2$ that is applied to the sensor element 1902.

FIG. 19 shows in particular the following components:

- $Bm_1$ is the field vector of the magnet (i.e. magnetic field) that affects the sensor element 1901;
- $Bm_2$ is the field vector of the magnet (i.e. magnetic field) that affects the sensor element 1902;
- Bd is a disturbance field vector;
- $B_1$ is a total field vector on the sensor element 1901; hence: $B_1 = Bm_1 + Bd$;
- $B_2$ is a total field vector on the sensor element 1902; hence: $B_2 = Bm_2 + Bd$;
- $\varphi$ is a rotational position (angle) of the magnet which is identical to the direction of the field of the magnet on the sensor element 1901;
- $\varphi_1'$ is the rotational position (angle) of the field detected by the sensor element 1901; and
- $\varphi_2'$ is the rotational position (angle) of the field detected by the sensor 1902 element;

wherein the magnetic fields of the magnet 103 on sensor elements 1901 and 1902 are assumed to be substantially anti-parallel.

Hence, the following applies:

$$\varphi_1' = \varphi + d\varphi_1 \text{ with } d\varphi_1 \approx \frac{B_{d\perp}}{Bm_1}$$

$$\varphi_2' = \varphi + 180° + d\varphi_2 \text{ with } d\varphi_2 \approx -\frac{B_{d\perp}}{Bm_2}$$

The system has the readings $\varphi_1', \varphi_2'$ of both sensing elements and infers the rotational position of the shaft via the formula $$\varphi = \frac{\varphi_1' + k \cdot (\varphi_2' - 180°)}{1+k}$$

whereby k is chosen in order to fulfil the condition $$d\varphi_1 + k \cdot d\varphi_2 = 0.$$

Inserting the equations for $d\varphi_1$ and $d\varphi_2$ as stated above results in $$k = -\frac{d\varphi_1}{d\varphi_2} = \frac{Bm_2}{Bm_1}.$$

So if k equals the ratio of fields of the magnet on the second angle sensor over the first angle sensor, the formula for the inferred rotational position of the shaft cancels out error terms from the disturbance field and gives the correct rotational position irrespective of disturbance fields $$\frac{\varphi_1' + k \cdot (\varphi_2' - 180°)}{1+k} = \frac{\varphi + d\varphi_1 + k \cdot (\varphi + d\varphi_2)}{1+k} = \frac{\varphi + k \cdot \varphi}{1+k} = \varphi$$

If, for example, $|Bm_1|=|Bm_2|$, then k equals 1 and $$\varphi = \frac{\varphi_1' + \varphi_2' - 180°}{2}.$$

According to an exemplary use-case scenario, the field of the magnet $Bm_2$ that affects the sensor element 1902 may be anti-parallel to the field of the magnet $Bm_1$ that affects the sensor element 1901. The disturbance field Bd is exemplarily assumed to be equal for both sensor elements 1901 and 1902.

The vector addition of the disturbance Bd field and the field of magnet $Bm_1$, $Bm_2$ shifts the field vector on one sensor element (in the case of FIG. 19 this is $B_1$ on the sensor element 1901) counterclockwise and the field vector on the other sensor element (in the case of FIG. 19 this is $B_2$ on sensor element 1902) clockwise.

Hence, the angle $\varphi_1'$ is larger than the angle $\varphi$, whereas the angle $\varphi_2'$ is smaller than the true angle $\varphi+180°$.

If the field vectors of the magnet applied to the sensor elements 1901 and 1902 are of equal absolute value, i.e.

$$|Bm_1|=|Bm_2|,$$

an angle error $d\varphi_1$ of the sensor element 1901 and an angle error $d\varphi_2$ of the sensor 1902 element are equal in magnitude and opposite in sign, i.e.:

$$d\varphi_1 = -d\varphi_2.$$

If the system produces the angle outputs of the sensor elements 1901 and 1902 it thus cancels out the angle errors that are based on the disturbance field Bd.

If the magnitudes of the field vectors of the magnet $Bm_1$, $Bm_2$ are not equal on both sensor elements 1901 and 1902, one sensor element 1901 or 1902 uses the factor $$k = \frac{|Bm_2|}{|Bm_1|}$$

when combining the angle outputs of the sensor elements 1901 and 1902 in order to cancel out (or at least reduce) the effect of the disturbance field Bd.

This in particular applies if the disturbance field vector Bd is perpendicular to the field vectors $Bm_1$ and $Bm_2$. In practice, the field of the magnet may be significantly larger than the disturbance field. For example, the field of the magnet may be larger than 30 mT, whereas the disturbance field may amount to less than 3 mT. In this example, the disturbance field may be more than 10-times smaller than the field of the magnet.

As indicated also in FIG. 19, the disturbance field vector Bd may comprise a field vector component $B_\parallel$ that is parallel to the field of the magnet and a component $B_\perp$ that is orthogonal to the field of the magnet.

Since the disturbance may be rather small compared to the field of the magnet, the component $B_\parallel$ may be neglected. Thus, the angle error results in $$\tan d\varphi_1 = \frac{Bd_\perp}{|Bm_1| + Bd_\parallel} \approx \frac{Bd_\perp}{|Bm_1|}.$$

As $d\varphi_1$ is small, $\tan d\varphi_1 \approx d\varphi_1$, which results in the following angle error for the sensor 1901:

$$d\varphi_1 \approx \frac{Bd_\perp}{|Bm_1|}.$$

Accordingly, the angle error for the sensor 1902 can be determined as follows:

$$d\varphi_2 \approx -\frac{Bd_\perp}{|Bm_2|}.$$

The opposite signs for the angle errors stem from the fact that the disturbance shifts the magnetic field vector in the opposite rotational direction.

Hence, the angle errors $d\varphi_1$ and $d\varphi_2$ are proportional to the disturbance with different signs. If one angle error is scaled by the factor k and added to the other angle error, these angle errors may be cancelled out or their effect may at least be significantly reduced.

The factor k may depend (only) on the ratio of field of the magnet on both angle sensors, it may not depend on the disturbance field. This bears the advantage that it works for all kinds of disturbance fields.

EXAMPLE

Magnetic Field Vectors $B_1$ and $B_2$ are Not Anti-Parallel

In another example, the magnetic field vectors $Bm_1$ and $Bm_2$ on the sensor elements 1901 and 1902 may not be anti-parallel. There may be an angle between the magnetic field vectors $Bm_1$ and $Bm_2$ amounting to, e.g., 150°. In such scenario the (at least partial) compensation of the disturbance field may work as follows:

The component $B_\perp$ that is orthogonal to the field of the magnet is different for the sensor elements 1901 and 1902, because the magnetic field vectors $Bm_1$ and $Bm_2$ are no longer on the same line. This results in the following angle errors for the sensor elements 1901 and 1902:

$$d\varphi_1 \approx \frac{Bd_{\perp 1}}{|Bm_1|},$$

$$d\varphi_2 \approx -\frac{Bd_{\perp 2}}{|Bm_2|}.$$

However, the ratio $$\frac{Bd_{\perp 1}}{Bd_{\perp 2}}$$

is fixed and depends (only) on the angle between the magnetic field vectors $Bm_1$ and $Bm_2$, in this example, 150°.

Hence, the factor k can be determined to fulfill the following requirement:

$$k = \frac{Bd_{\perp 1} \cdot |Bm_2|}{Bd_{\perp 2} \cdot |Bm_1|}.$$

For small disturbance fields the output angle of a single magnetic angle sensor has a worst case error that equals the ratio of the disturbance field over the field of the magnet (in radians). If the field of the magnet on two angle sensors differs by an angle ψ and the rotational position is derived by a linear combination of the output angles of both angle sensors, then the worst case errors are equal to the ratio of the disturbance field over the field of the magnet times the cosine of ψ/2. Hence, the combination of two angle sensors reduces the worst case error caused by disturbance fields by 1/cos(ψ/2), which is infinite for ψ=180° and which equals 2 for ψ=120°. For ψ=90° it is 1.4 and for smaller ψ it is between 1.4 and 1.0. Therefore, combining the outputs of both angle sensors the system can achieve a good reduction of background fields as long as the angles on both sensors differ by 120° or more, preferably close to 180°.

Example: An axially magnetized quadrupole ring magnet with 10 mm inner diameter, 20 mm outer diameter, 3 mm thickness, 200 mT remanence (i.e. injection molded ferrite) may produce a magnetic field amounting to 15 mT at z=3.5 mm and −15 mT at z=−3.5 mm (z=0 being the symmetry plane of the magnet, and the z-axis is the symmetry axis of the ring magnet). The magnetic angle sensor elements 1901 and 1902 may be placed at z=+/−3.5 mm, i.e. 7 mm apart from each other. The sensor elements 1901 and 1902 hence may experience magnetic inductions of 15 mT in opposite diametrical directions. The fields can be three times larger if the magnet is made from injection molded NdFeB-magnets.

EXAMPLE

Two Magnets at the Ends of a Shaft

It is noted that the solution described herein in not limited to the magnet arrangement shown and described above. For example, at least two magnets can be used.

Figure 3:
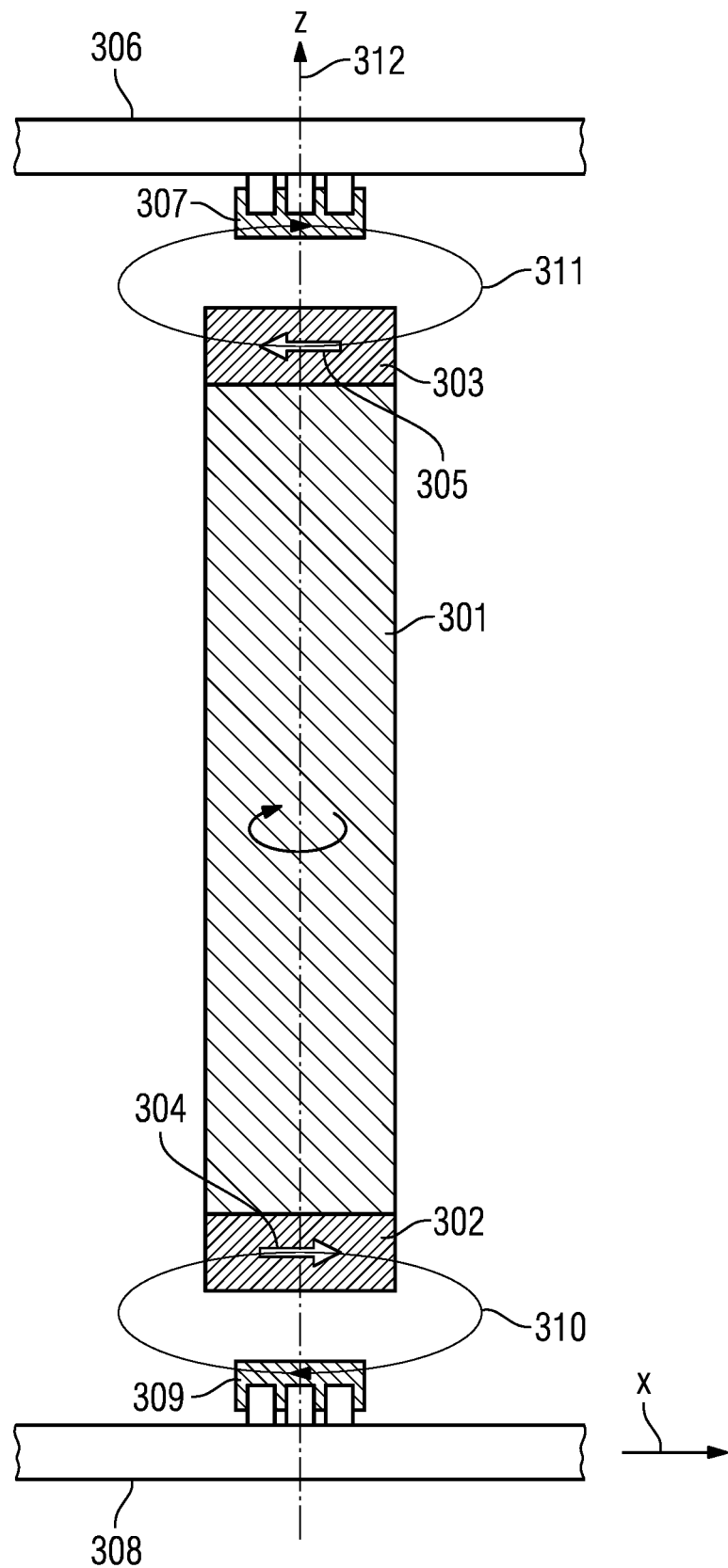
FIG. 3 shows an exemplary arrangement comprising a shaft with two magnets arranged at the top and at the bottom of the shaft and two angle sensors arranged in the vicinity of the magnets.

FIG. 3 shows an exemplary arrangement comprising a shaft 301 that is arranged rotatably around a z-axis 312. A magnet 303 is arranged at the top of the shaft 301 and a magnet 302 is arranged at the bottom of the shaft. The magnet 303 has a diametrical magnetization 305 in negative x-direction and the magnet 302 has a diametrical magnetization 304 in positive x-direction.

A package 307 including a magnetic angle sensor is arranged on a component board 306, wherein the package 307 is arranged adjacent to and points towards the magnet 303 such that a magnetic field 311 emitted from the magnet 303 has an impact in positive x-direction on the magnetic angle sensor of the package 307.

A package 309 including a magnetic angle sensor is arranged on a component board 308, wherein the package 309 is arranged adjacent to and points towards the magnet 302 such that a magnetic field 310 emitted from the magnet 302 has an impact in negative x-direction on the magnetic angle sensor of the package 309.

The magnets 302, 303 may be block-shaped or cylindrical magnets. A system may combine the readings of both angle sensors of the packages 307 and 309.

EXAMPLE

Ring Magnet and Additional Magnet Attached to the Shaft

As an alternative, a sensor dome may be inserted into the ring magnet such that one sensor is substantially in the center of the ring magnet.

Figure 4:
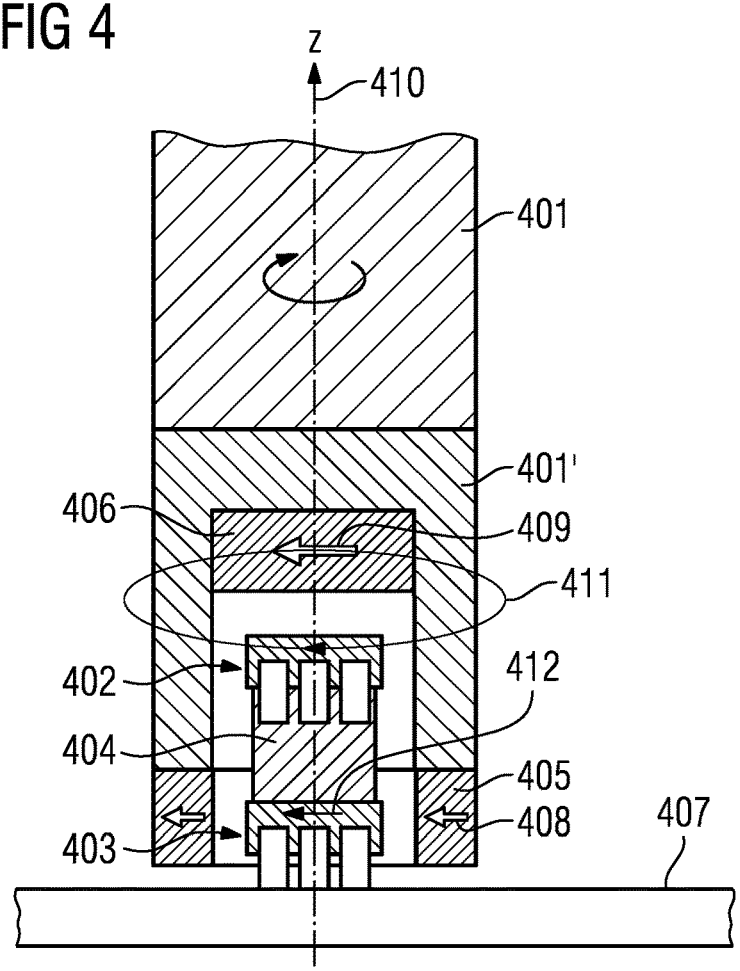
FIG. 4 shows an exemplary arrangement comprising a shaft with a bore, wherein one magnet is arranged at the bottom of the bore and a ring magnet is arranged at the end of the shaft so that a sensor dome comprising two angle sensors can be inserted into the bore of the shaft through the hole of the ring magnet.

FIG. 4 shows an exemplary arrangement comprising a shaft 401 that is arranged rotatably around a z-axis 410. In an exemplary embodiment, the shaft 401 (including a supporting structure 401') may have a bore with a magnet 406 arranged at the bottom of the bore. Another ring magnet 405 is arranged at the bottom of the shaft 401.

In an alternative embodiment, the shaft may be fixed to the supporting structure 401' (being a part separate from the shaft 401) that holds the magnets 405 and 406. This supporting structure 401' may have an opening in which the magnet 406 is located and an end to which the ring magnet 405 can be attached (as indicated also in FIG. 4).

A sensor dome comprises a magnetic angle sensor 402, a distance element 404 and a magnetic angle sensor 403. The magnetic angle sensor 402 is connected via the distance element 404 and via the magnetic angle sensor 403 to a component board 407. Also, the magnetic angle sensor 403 is connected to the component board 407. The sensor dome is arranged at least partially inside the bore such that the magnetic angle sensor 403 is located in the hole of the ring magnet 405. In such case, the magnetic angle sensor 402 is located adjacent to the magnet 406 at the bottom of the bore.

The magnet 406 and the ring magnet 405 have diametrical magnetizations 408, 409 in negative x-direction.

A magnetic field 411 emitted from the magnet 406 has an impact in positive x-direction on the magnetic angle sensor 402 and the magnetic field 412 emitted from the ring magnet 405 has an impact in negative x-direction on the magnetic angle sensor 403.

The ring magnet 405 may be magnetized diametrically. Furthermore, the magnet 406 can be realized as a cylinder magnet that is attached into the stud hole of the shaft 401 such that it is close to the magnetic angle sensor 402. The magnet 406 may also be diametrically magnetized.

If the diametrical directions of magnetization 408, 409 for both magnets 405, 406 are parallel, the magnetic fields 412, 411 on the sensors 403, 402 are anti-parallel.

It is noted that the arrangement shown in FIG. 4 does not have to be a quadrupole arrangement; the solutions described herein may in particular utilize axially magnetized quadrupoles or dipole arrangements. Examples for the latter are shown in FIG. 3 and FIG. 4.

Embodiments Combining the Magnets 405 and 406

The magnet 405 and the ring magnet 406 could also be fixed together via an intermediate frame that holds both magnets. This frame may preferably be non-magnetic, e.g., plastic. These magnets may be also injection molded plastic magnets, where permanent magnetic powder, flakes, or grains are embedded in a plastic matrix. Then the magnet and the frame can be manufactured cost efficiently in a two-step mold process.

The separate magnets 405 and 406 may be combined in a single magnet, wherein a wall thickness of the part between the ring and the cylinder is small enough so that the magnetic fields that are inflicted on both magnetic angle sensors 402, 403 are strong enough and point in opposite or at least in two different directions.

Figure 5:
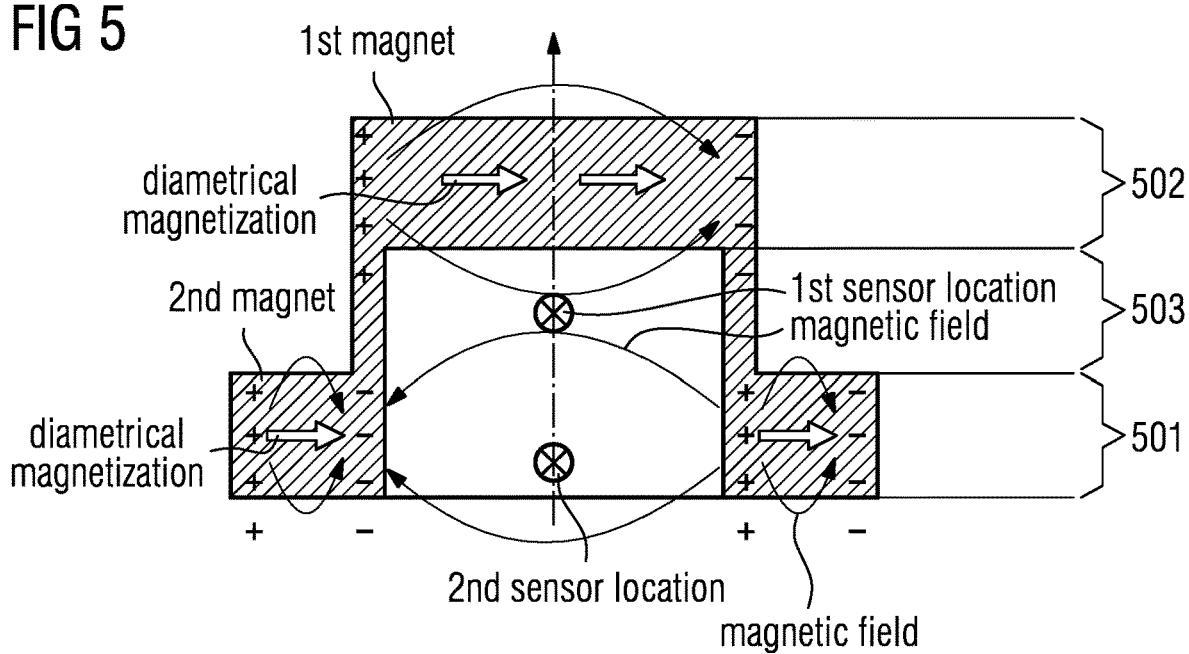
FIG. 5 shows a schematic diagram of a combined single magnet comprising a ring magnet portion, a cylindrical magnet portion and a combining (i.e. connecting) portion.

FIG. 5 shows a schematic diagram of a combined single magnet comprising a ring magnet portion 501, a cylindrical magnet portion 502 and a combining (i.e. connecting) portion 503.

If the magnets 405 and 406 in FIG. 4 are mounted on the supporting structure 401' prior to magnetization or if a single piece magnet according to FIG. 5 is used, it is advantageous that the magnetization is conducted via a single magnetization pulse in a homogeneous magnetization field, because then the magnetization is homogeneous throughout the magnet. So the combination of a block or cylinder magnet with a ring magnet according to FIG. 4 and FIG. 5 offers the advantage of generating magnetic fields on opposite directions on both sensor elements while being manufactured economically merely with a single homogeneous field pulse.

Exemplary Embodiments of Sensor Domes

Figure 6:
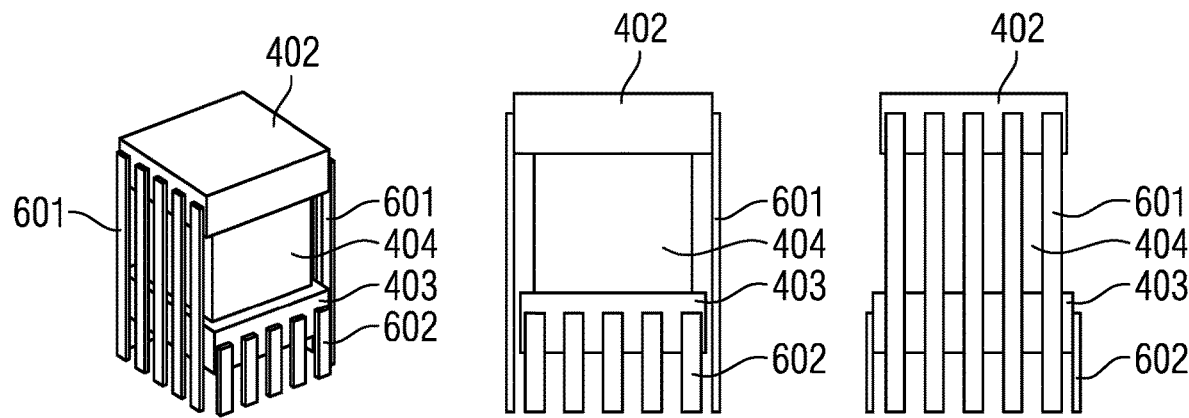
FIG. 6 shows exemplary realizations of the sensor dome of FIG. 4 from various angles/sides.

FIG. 6 shows exemplary realizations of the sensor dome of FIG. 4 from various angles/sides. The magnetic angle sensors 402 and 403 are spaced by the distance element 404. In this example, the magnetic angle sensor 402 has several contact elements 601 and the magnetic angle sensor 403 has several contact elements 602 that can be electrically connected to the component board 407.

For illustration purposes, the magnetic angle sensors 402 and 403 are shown as mold bodies with embedded magnetic angle sensor elements. The contact elements 601, 602 (leads) may be electronically connected to the magnetic angle sensors elements within the mold bodies.

It is an option, to cut off the corners of the mold bodies so that the square shape of the mold bodies in the x-y-plane becomes substantially similar to octagons and requires less space inside the bore, e.g., the bore of the magnet shown in FIG. 5.

The semiconductor dies can be attached to the die paddles of the contact elements 601, 602, whereby the dies of the sensor elements can be mounted above or below the die paddles. For example, the die of the angle sensor 403 can be mounted below the die paddle and the die of the angle sensor 402 can be mounted above the die paddle in order to maximize the axial spacing for a given size of the distance element 404. Of course, this approach can be reversed, too.

The axial size of the distance element 404 may be in the range between 1 mm and 10 mm. If this axial size is sufficiently small, the dies of both angle sensors can be mounted in a single package, e.g., with a single leadframe.

Figure 7:
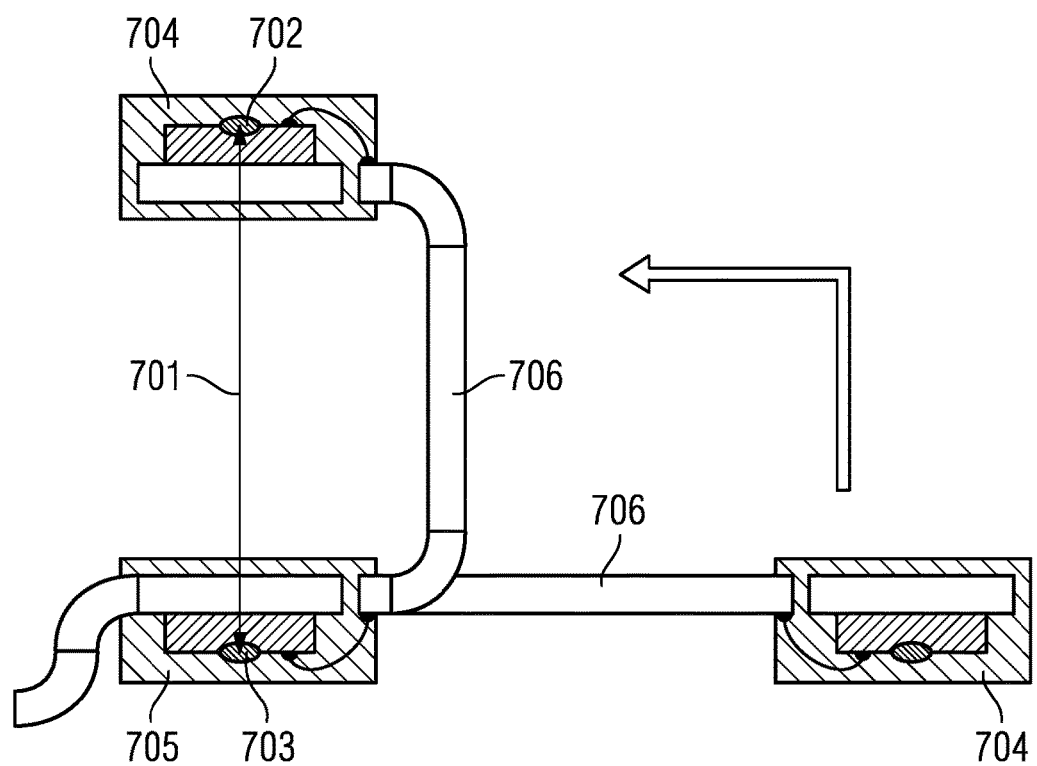
FIG. 7 shows a diagram that visualizes how two angle sensor elements can be placed in a defined axial distance to each other.

FIG. 7 shows a diagram that visualizes how two angle sensor elements 702 and 703 can be assembled on a single leadframe 706. Then the leadframe 706 is bent so that the sensor elements 702 and 703 are placed in a defined axial distance 701 to each other and at the same time they can be electrically connected via the leadframe 706.

The angle sensor element 702 is embedded in a mold 704, which is attached to a leadframe 706. Also, the angle sensor 703 is embedded in a mold 705, which is attached to the leadframe 706. The leadframe 706 can be bent to achieve an axial spacing 701 between the angle sensor elements 702 and 703.

EXAMPLES

Magnet Structures

In a further example, an arrangement may comprise two ring magnets of diametrical magnetization and the two ring magnets have anti-parallel directions of magnetization. This results in a diametrically magnetized quadrupole. In an exemplary embodiment, each ring magnet may have an inner diameter of 10 mm, an outer diameter of 14 mm and an axial thickness of 3 mm. Both rings may be spaced 2 mm apart in an axial direction. The ring magnets may be arranged parallel to an x-y-plane and the center of their hole lies within the z-axis. Also, the two ring magnets are arranged in parallel to each other (around the z-axis).

Figure 8:
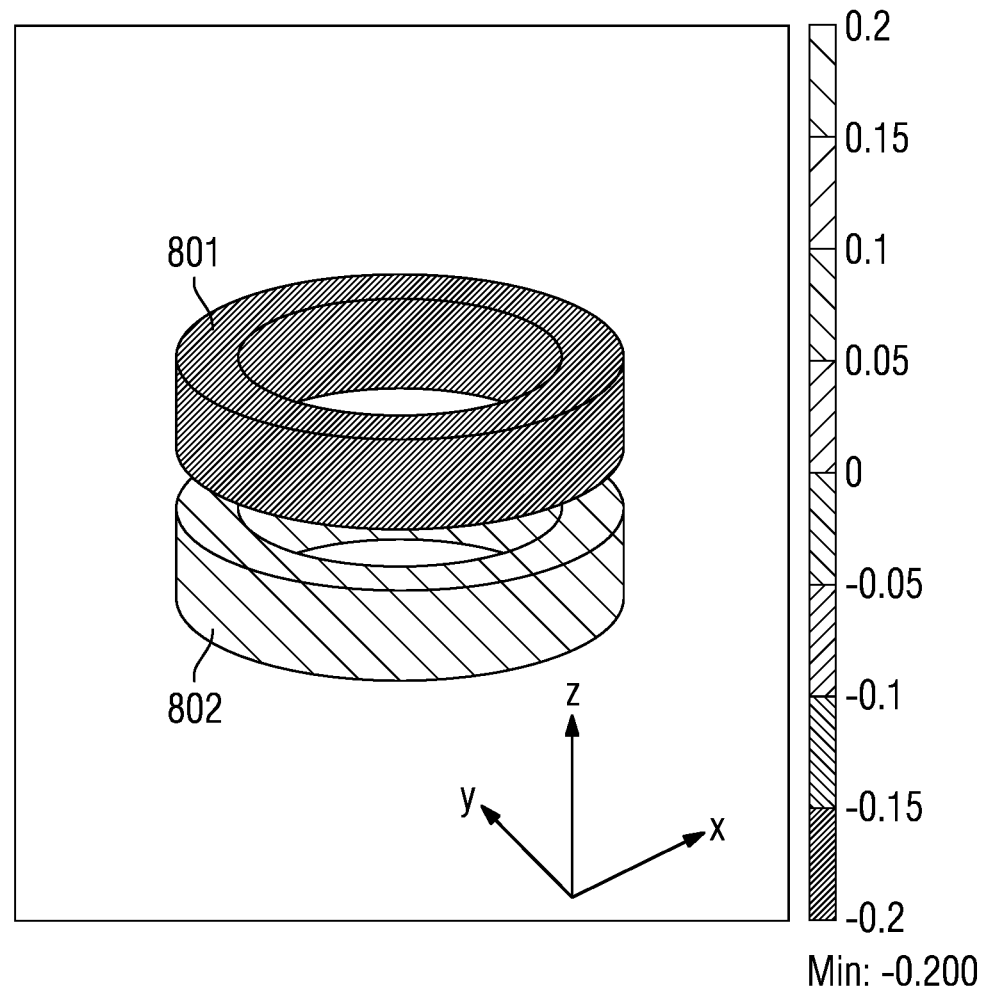
FIG. 8 shows an exemplary arrangement of two ring magnets in the x-y-z-space.

FIG. 8 shows an exemplary arrangement of two ring magnets 801, 802 in the x-y-z-space, whereby the magnet ring 801 is substantially homogeneously magnetized in negative y-direction and the magnet ring 802 is magnetized in positive y-direction both with a remanence of, e.g., 0.2 T.

Figure 9:
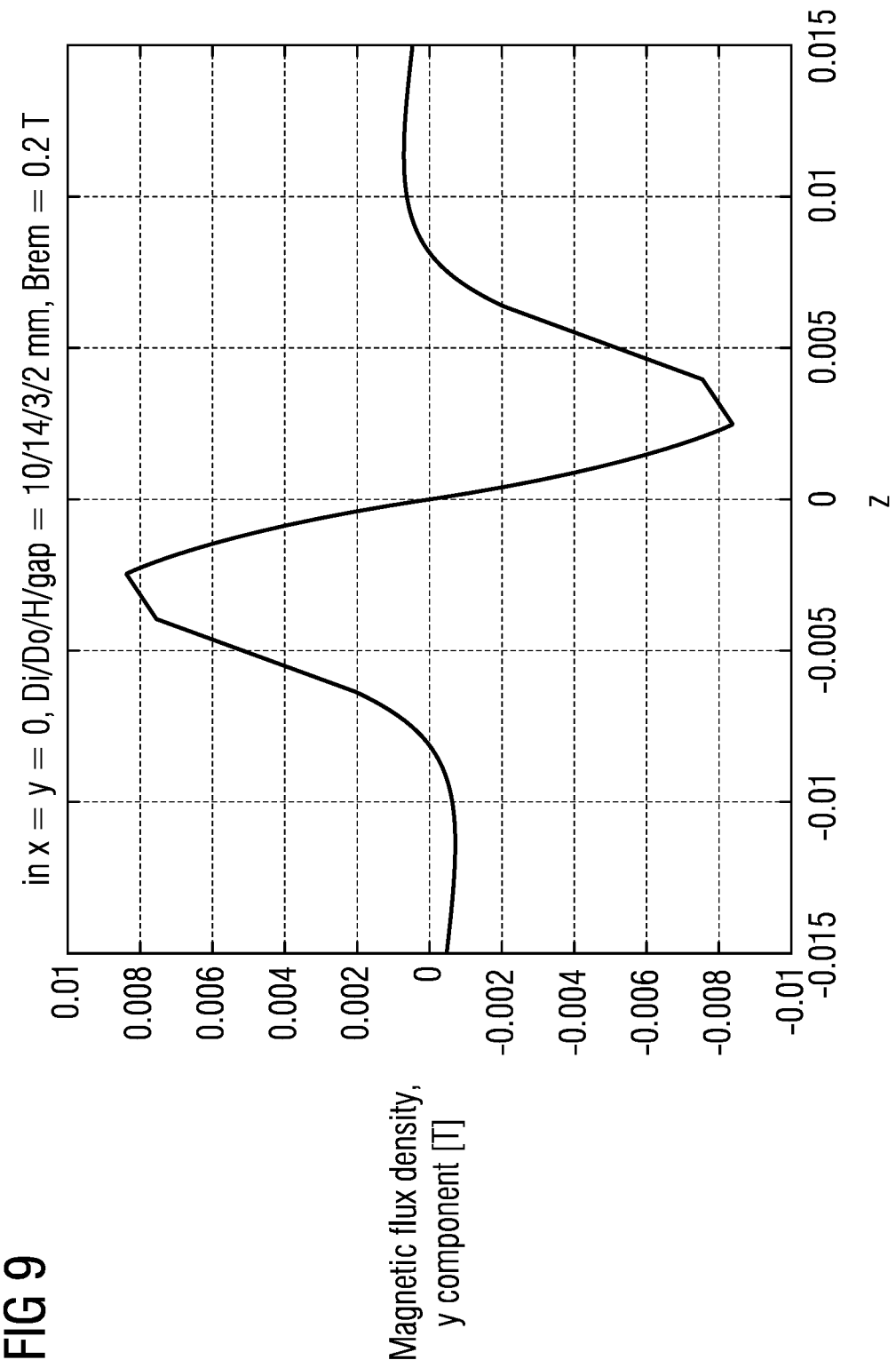
FIG. 9 shows a diagram visualizing the magnetic flux density over the z-axis for the arrangement depicted in FIG. 8.

FIG. 9 shows a diagram visualizing the magnetic flux density over the z-axis for the arrangement depicted in FIG. 8.

An induction field on the z-axis points in y-direction with extremes of +/−8 mT at z-positions z=+/−3.7 mm.

As an option, a soft-magnetic sleeve could be placed around the magnets. For example, a hollow soft-magnetic cylinder can be used and the two magnets could be mounted inside this cylinder's bore. Two magnetic angle sensors may be placed near the centers of both magnets. This may increase the strength of the magnetic field on both magnetic angle sensors and the soft-magnetic sleeve shields off a portion of externally applied disturbance fields. A reduction of the disturbances by a factor ranging between 3 and 20 may be feasible depending on the relative permeability of the sleeve, its bore diameter, its wall thickness and if the permanent magnet drive the sleeve into saturation or not. Such an arrangement can be used to make the magnetic angle sensing system robust against disturbance fields even if they are considerably large (e.g., in the order of 100 mT or more).

It is a further option that each of the ring magnets is magnetized in a Halbach-pattern, whereby both ring magnets are rotated against each other by 180° to apply opposite diametrical fields on the two magnetic angle sensors. Each ring magnet can be unitary or segmented, round or angled.

Figure 10:
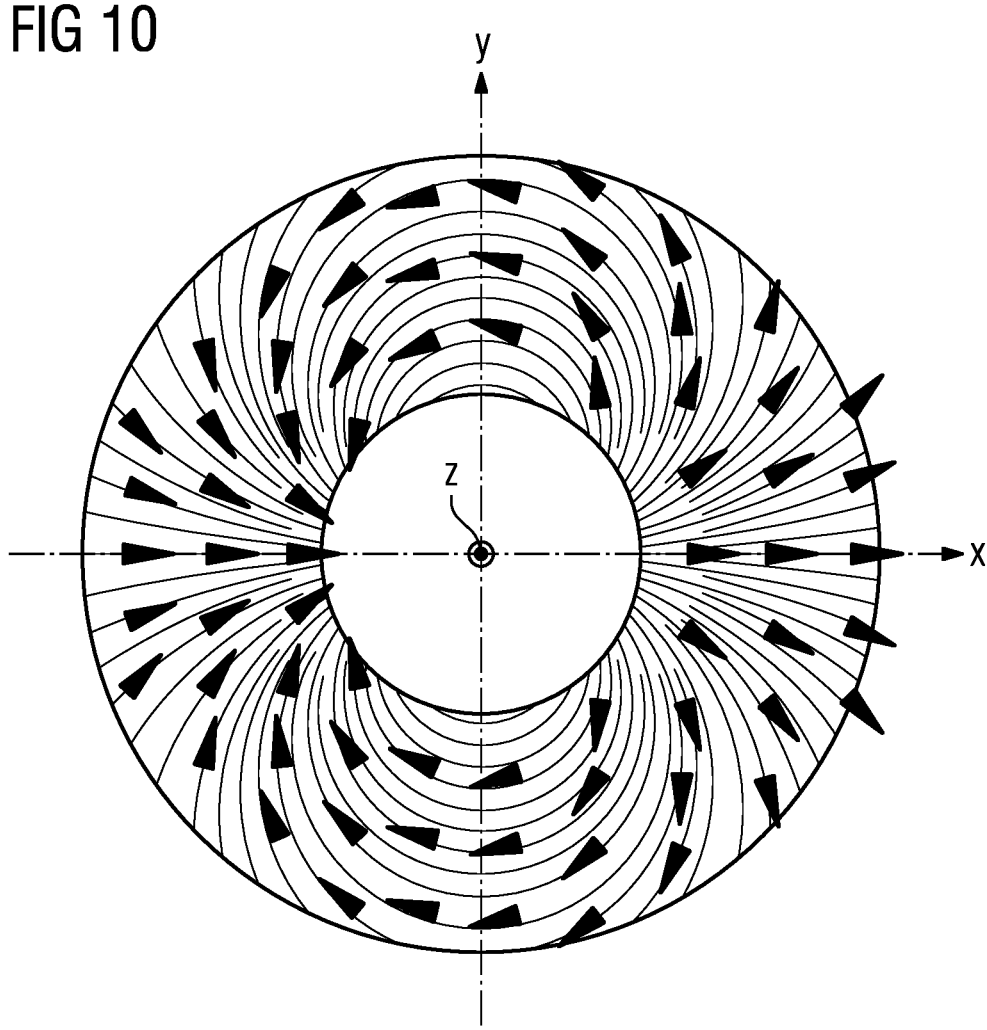
FIG. 10 shows an exemplary magnetization of a ring magnet comprising a Halbach-pattern.

FIG. 10 shows an exemplary magnetization of a ring magnet comprising a Halbach-pattern. The arrows show the direction of the magnetization. The z-axis is the symmetry axis of the magnet and also the rotation axis.

FIG. 11 shows an exemplary embodiment of a ring magnet (see also: http://www.frenergy.com.au/products/D100-Halbach-Array-Ring-(k%3D4)-%252d-Disassembled.html). The arrows show the direction of the magnetization vector field, wherein the head of the arrow indicates the north pole and the tail of the arrow indicates the south pole of the magnetic moment. As can be seen in FIG. 11, the ring magnet comprises segments 1101 to 1104 with different magnetizations. Each segment 1101 to 1104 may have substantially the same size and the ring magnet comprises a total of 12 segments. The combination of segments 1101, 1102, 1103 and 1104 is repeated three times to build the ring magnet. In an exemplary embodiment, the ring magnet may have an outer diameter amounting to 100 mm, an inner diameter amounting to 60 mm and a thickness amounting to 30 mm. The segments may be N45 magnets comprising Nickel and/or Neodymium.

The magnet shown in FIG. 11 can be simpler manufactured than the magnet shown in FIG. 10, because the segments of the magnet of FIG. 11 can be magnetized homogeneously and separately from each other and assembled afterwards, whereas the magnet of FIG. 10 needs to be magnetized inhomogeneously in a single run, which requires a more complicated magnetization coil with exact alignment and position of the magnet against the coil.

Figure 12:
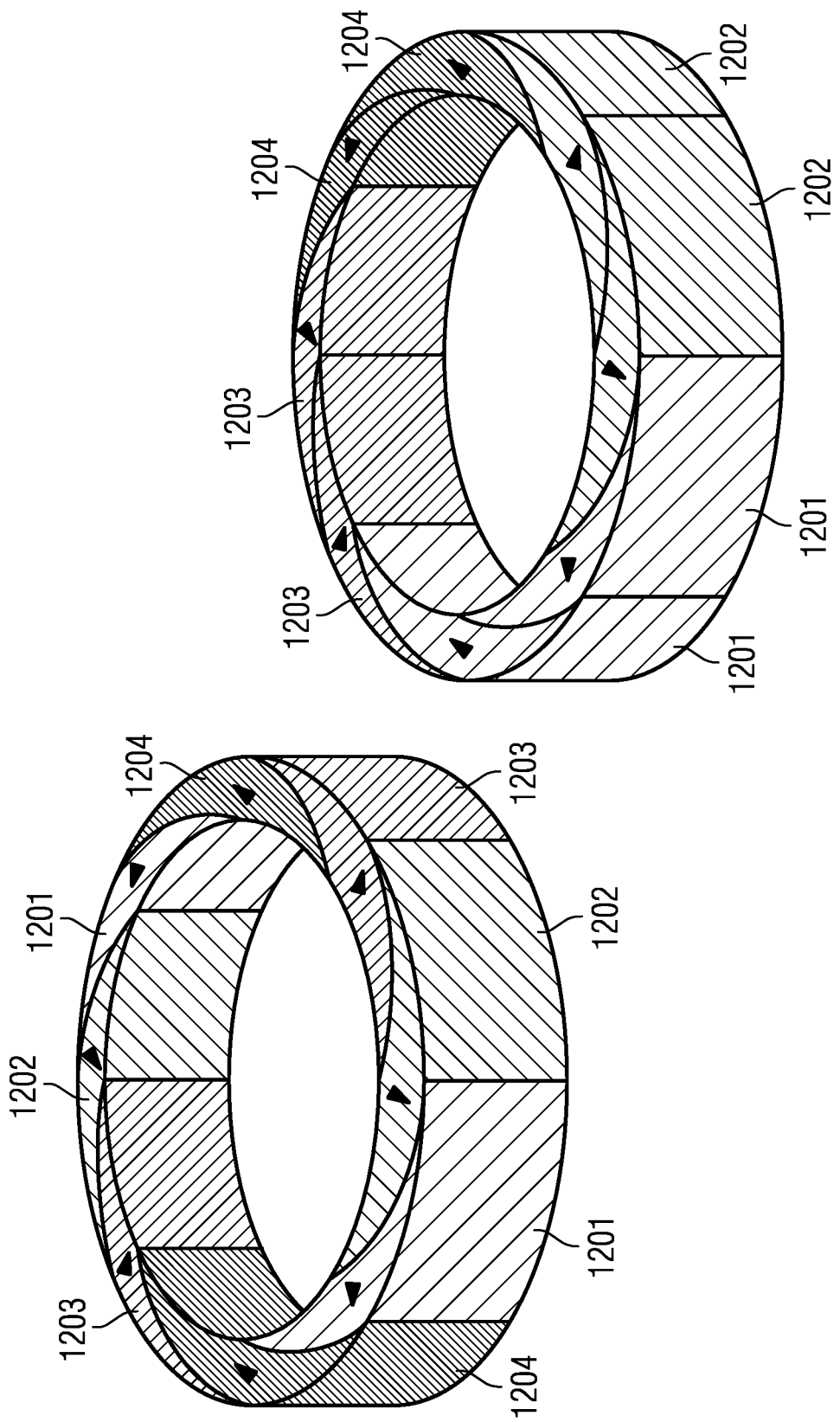
FIG. 12 shows two alternative embodiments of how four different segments can be shaped and/or assembled together to build ring magnets.

FIG. 12 shows two alternative embodiments of how four different segments 1201 to 1204 can be shaped and/or assembled together to build ring magnets (see also: https://simulation.uni-freiburg.de/Teaching/projects/OldStuff/Student%20positions/Miniaturized%20Halbach%20magnet%20array).

The magnets depicted in FIG. 11 and FIG. 12 are two exemplary embodiments from many possibilities how to approximate the ideal Halbach pattern of FIG. 10 with a finite number of homogeneously magnetized segments.

The magnetic field used for the angle sensors may also be provided by a Halbach quadrupole magnet according to FIG. 13, which shows a magnetization pattern as follows:

A radial magnetization component amounting to
$M_R = M_{rem} \cos(2\psi)$ an azimuthal magnetization component amounting to
$M_\psi = M_{rem} \sin(2\psi)$ wherein
$M_{rem}$ is the remanent magnetization of the magnet material, and $\psi$ is the azimuthal coordinate of a test point where the magnetic field is sampled.

FIG. 13 shows this magnetization pattern for rings and cylinders. The magnetization pattern does not change along the z-position of the magnet. In other words, FIG. 13 corresponds to a sectional view through the magnet at any z-position; i.e., the pattern shown in FIG. 13 does not change regardless of the z-position that is chosen as a sectional view through the magnet.

Sensor Placement

The angle sensors might be placed below and/or above the magnets or—in the case of ring magnets—near the center of the ring magnets (i.e. at the position with the highest symmetry). On the rotation axis (x=y=0), the magnetic field vanishes for Halbach quadrupole magnets according to FIG. 13. However, the magnetic field increases substantially linearly with radial distance from the rotation axis.

In a more strict sense, however, the radial and azimuthal magnetic field components have slightly different amplitudes. Hence, the diametrical magnetic field component $\vec{B}_{diam} = \vec{B} - (\vec{B} \cdot \vec{n}_z)\vec{n}_z = (\vec{B} \cdot \vec{n}_x)\vec{n}_x + (\vec{B} \cdot \vec{n}_y)\vec{n}_y$ applied to the first magnetic angle sensor (at a location of, e.g., x=1.5 mm, y=0 with an arbitrary z position) rotates elliptically when the magnet turns round. Such elliptic rotation of a vector results in the tip of the vector moving along an ellipse when its end is fixed to the origin of the reference frame. In other words, the angle of the diametrical magnetic field component with a fixed reference direction is not identical to the rotational position, but it slightly differs according to such small ellipticity.

Therefore it is favorable to have ellipticities close to 1, which means that during rotation of the magnet the tip of the diametrical field vector sampled in a fixed test point moves substantially along a circle while its end is fixed. The ellipticity may be negligible for test points near the center of ring magnets.

In an exemplary scenario, two ring magnets with 10 mm inner diameter and 20 mm outer diameter, yet different axial thickness of 3 mm and 13 mm may be used. The long magnet has an about 10 times smaller "ellipticity minus 1". The smaller "ellipticity minus 1" the more accurate the magnetic angle sensor. For angle errors less than 0.1° the ellipticity differs from 1 by less than 0.25%. Hence, the 13 mm ring magnet achieves this requirement as long as the magnetic angle sensors are placed in the mid-plane of the ring (i.e. at z=0) and less than 1.5 mm distant from the axis of rotational symmetry.

However, the ellipticity of the 13 mm ring magnet gets worse for larger radial and/or axial distance from the center of the ring.

Further, a remanence amounting to 200 mT (e.g. a ferrite magnet) may be assumed. The ring magnet generates substantially equally strong magnetic fields which are equally strong and point in opposite directions, i.e. $Bm_1=Bm_2$ and $\psi=180°$. The distance of both magnetic angle sensors may be small enough to place both of them on the same chip or at least in the same sensor package (e.g., using two semiconductor chips side by side). The combining circuit for determining $$\varphi = \frac{\varphi'_1 + \varphi'_2}{2}$$

may also be located on the same chip. This system is robust against background magnetic fields, it uses a single chip or several chips in a single package, it has a small form factor (i.e. its axial space is small) and it is robust against assembly tolerances.

EXAMPLE

Sensor Placement Using a Halbach-Pattern Single Magnet

Using a Halbach-pattern in a ring magnet, two magnetic angle sensors may be placed side by side, i.e. at identical axial positions. An exemplary arrangement may be as follows: The first angle sensor element is placed at a coordinate (x, y)=(1 mm, 0) and the second angle sensor element is placed at a coordinate (x, y)=(−1 mm, 0). Hence, the two angle sensor elements are located on a straight line perpendicular through the rotation axis with the rotation axis being in the center between both angle sensor elements. Both sensor elements may be located on the same semiconductor die or they may be placed on different dies of a single sensor package. For example, two dies comprising the sensor elements may be mounted to a larger die paddle of a leadframe inside the sensor package. The magnet may apply opposite magnetic field directions on both angle sensor elements for all rotational positions around the z-axis. Thus, the period of the magnetic field is less than 360°, e.g., 180° or an integer fraction thereof. In such case, the sensor system has unique angle readings in a 180° angular range.

Figure 14:
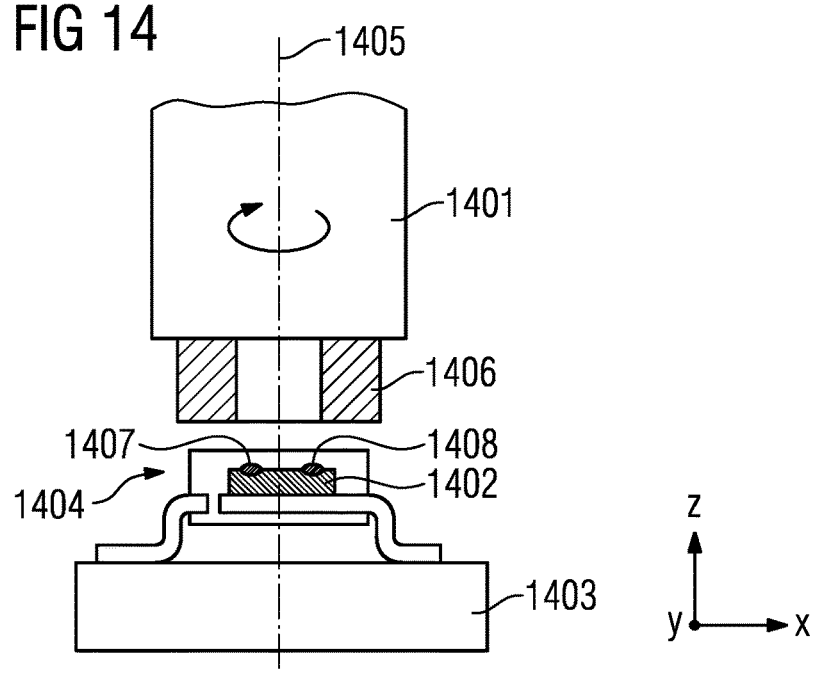
FIG. 14 shows an exemplary embodiment comprising a ring magnet with a Halbach-magnetization, which is attached to a rotatable shaft and two angle sensor elements that are arranged on an axis perpendicular to the rotation axis.

FIG. 14 shows an exemplary embodiment comprising a ring magnet 1406 with a Halbach quadrupole magnetization according to FIG. 13, which is attached to a rotatable shaft 1401. The shaft 1401 rotates around a z-axis 1405.

An SMD-sensor (SMD: Surface Mounted Device) package 1404 is mounted on a component board 1403. The SMD-sensor package 1404 comprises a sensor chip 1402 with two magnetic angle sensors 1407 and 1408, which are spaced apart from each other, wherein a line through both angle sensors 1407 and 1408 is perpendicular to the z-axis 1405 and wherein both angle sensors 1407 and 1408 are equally distanced from the z-axis 1405. Each angle sensor 1407, 1408 detects the angle between the diametrical magnetic field component and a diametrical reference direction (e.g. x-direction).

The SMD-sensor package 1404 is located adjacent to the ring magnet 1406. A rotation of the shaft 1401 also rotates the ring magnet 1406. This results in a change of the magnetic field that affects the angle sensors 1407 and 1408.

Hence, the Halbach-quadrupole ferrite ring magnet 1406 with, e.g., 10 mm inner diameter, 20 mm outer diameter and 13 mm axial length can provide anti-parallel magnetic fields on the two diametrically opposite magnetic angle sensors 1407 and 1408 at the same axial position. For radial positions between 1 mm and 1.5 mm the magnetic fields are strong (45 mT . . . 55 mT) for magnetic angle sensors being magneto-resistors or Hall effect devices, and they are sufficiently accurate (i.e. they have small enough ellipticity) for accurate angle sensing with an error of less than 0.1° to 0.2° even if the axial placement is subject to tolerances of less than 1 mm.

Shaft with Limited Angle Movement

There are applications wherein the shaft does not rotate freely, but it only rotates within a given limited angle, e.g., 100° or 150°. In such applications, two cylindrical magnets can be mounted on the shaft with a clamping structure, wherein the two magnets have a certain axial spacing from each other. Further, the angle sensors can be mounted via a clamping structure in a similar axial spacing such that the first sensor is closer to the first magnet than to the second magnet and the second sensor is closer to the second magnet than to the first magnet. Both magnets may be magnetized in various ways to achieve magnetic fields in significantly different directions on both sensors. For example, both magnets may be magnetized diametrically, but also anti-parallel to each other.

Figure 15:
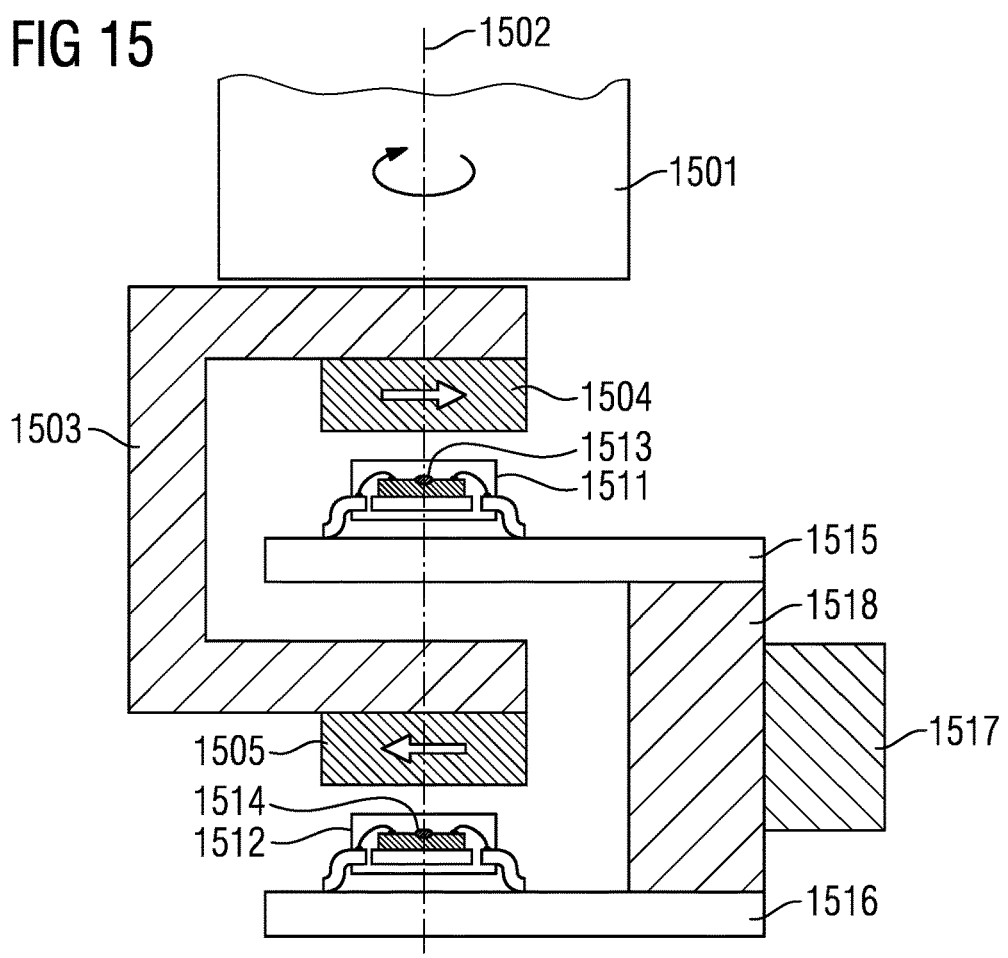
FIG. 15 shows an exemplary embodiment for measuring angular strokes of less than a full revolution.

FIG. 15 shows an exemplary embodiment for measuring angular strokes of less than a full revolution.

A rotatable shaft 1501 is arranged rotatably around a z-axis 1502. The rotatable shaft 1501, however, rotates less than 360°. The rotatable shaft 1501 is connected to a rotor frame 1503 to which a magnet 1504 and a magnet 1505 are attached.

The magnet 1504 is arranged such that it has a magnetization that is substantially perpendicular to the z-axis 1502 (indicated by the arrow of the magnet 1504). The magnet 1504 may be arranged symmetrically around the z-axis 1502.

The magnet 1505 is arranged such that it has a magnetization that is substantially perpendicular to the z-axis 1502 (indicated by the arrow of the magnet 1505), but in opposite direction as the magnetization of the magnet 1504. The magnet 1505 may be arranged symmetrically around the z-axis 1502.

The rotor frame 1503 may be u-shaped such that another u-shaped construction can be used to arrange sensor elements 1513 and 1514 on the z-axis 1502 and adjacent to the magnets 1504 and 1505.

This u-shaped construction is as follows: a stator 1517 is connected to a stator frame 1518 to which component boards 1515 and 1516 are connected on both sides of the stator frame 1518. The component boards 1515 and 1516 extend towards the z-axis 1502.

On the top of the stator frame 1518 the component board 1515 is arranged, which enters the u-shape of the rotor frame 1503; a sensor package 1511 comprising the angle sensor element 1513 is placed on the component board 1515. The sensor package 1511 is located in the vicinity of the magnet 1504 and the angle sensor element 1513 lies on the z-axis 1502.

On the bottom of the stator frame 1518 the component board 1516 is arranged. A sensor package 1512 comprising the angle sensor element 1514 is placed on the component board 1516. The sensor package 1512 is located in the vicinity of the magnet 1505 and the angle sensor element 1514 lies on the z-axis 1502.

One advantage of this exemplary embodiment is that each angle sensor 1513, 1514 provides an angle reading, which may be inaccurate due to a disturbance magnetic field. This inaccuracy usually amounts to less than ca. 5°. Thus, the angle sensors 1513, 1514 may provide two inaccurate, but redundant angle readings.

It is also an advantage that the angle sensors 1513, 1514 may be of different technologies to increase the robustness and diversity of the system. For example, one of the angle sensors may be a TMR and the other may be an AMR or a Vertical Hall sensor. Using different technologies mitigates the risk that both angle sensors fail under severe conditions.

It is in particular an option that a combining circuit (not shown in FIG. 15) can be used to combine the signals provided by the angle sensors 1513 and 1514 (and supplied by their sensor packages 1511 and 1512). Such combination may include a weighting of the signals, e.g., determining an average value. This bears the advantage that errors based on background effects are mitigated.

It is noted that the example shown in FIG. 15 is merely one out of many possible implementations. In another example, the sensor packages 1511 and 1512 may be mounted on the component board 1515, e.g., the sensor package 1511 on top and the sensor package 1512 on the lower side of the component board 1515. In such scenario, the angle sensors 1513 and 1514 are both located between the magnets 1504, 1505.

In an alternative embodiment, the two magnets 1504, 1505 may be arranged between the two sensor packages 1511, 1512.

Further Embodiments

The solution presented herein could also be used for through-shaft, off-axis magnetic angle sensors.

Figure 16:
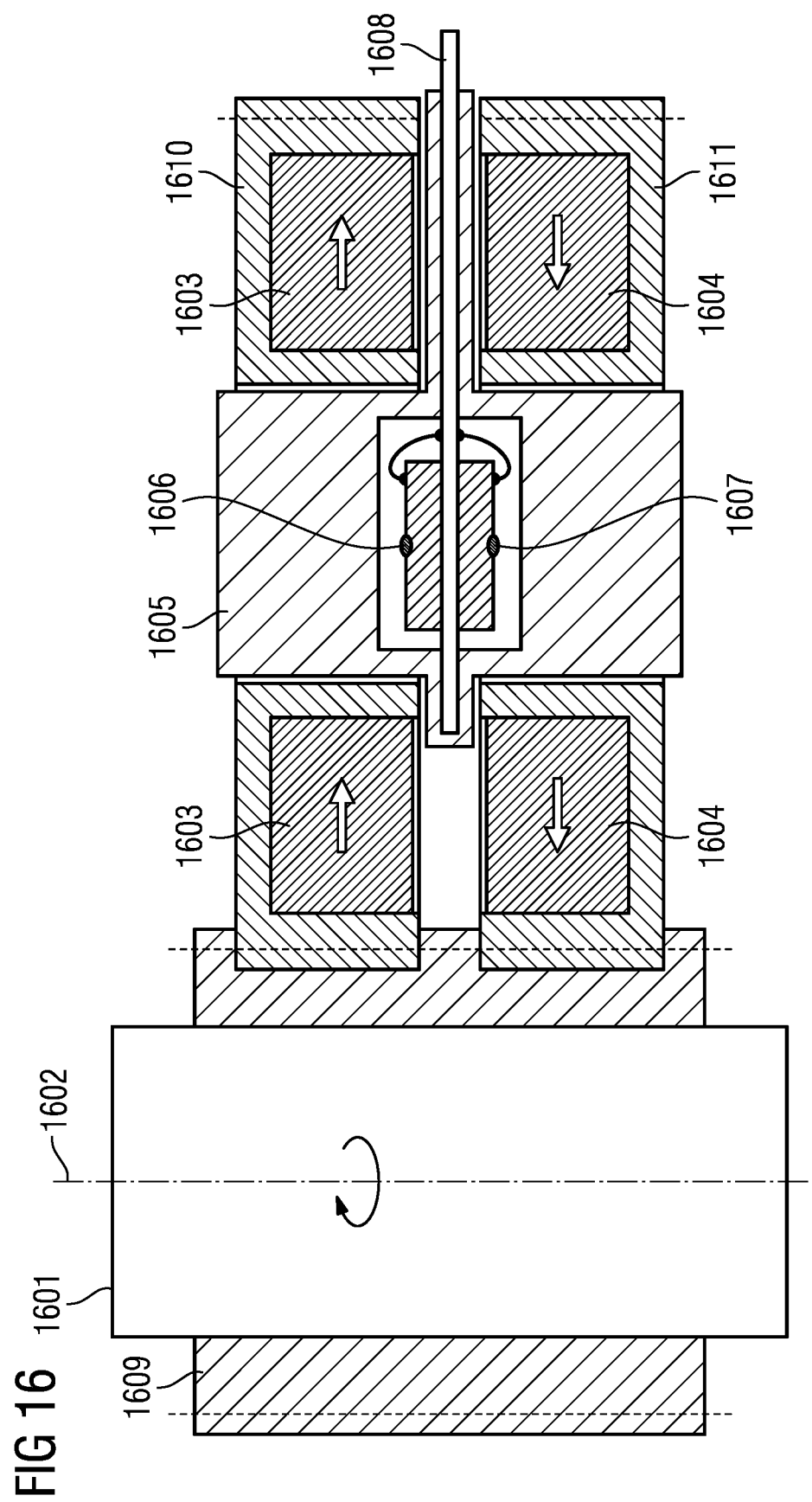
FIG. 16 shows an example of an off-axis magnetic angle sensor arrangement, wherein a toothed wheel that is fixed to a rotatable shaft is engaged with toothed wheels that drive ring magnets that have an impact on two angle sensor elements.

FIG. 16 shows an example of an off-axis magnetic angle sensor arrangement. A rotatable shaft 1601 is arranged rotatably around a z-axis 1602. A toothed wheel 1609 is attached to the shaft 1601. The toothed wheel 1609 is engaged with a toothed wheel 1610 and a toothed wheel 1611.

The toothed wheel 1610 comprises a ring magnet 1603, which may be embedded in the toothed wheel 1610. The ring magnet 1603 has a magnetization in a direction as shown by the arrows inside the ring magnet 1603.

The toothed wheel 1611 comprises a ring magnet 1604, which may be embedded in the toothed wheel 1611. The ring magnet 1604 has a magnetization in an opposite direction compared to the ring magnet 1603; this is also shown by the arrows inside the ring magnet 1604.

Hence, the shaft 1601 via its toothed wheel 1609 drives the toothed wheel 1610 and the toothed wheel 1611 thereby moving the embedded magnets 1603 and 1604.

A stator 1605 comprises a leadframe 1608 to which an angle sensor element 1606 and an angle sensor element 1607 are connected. The angle sensor elements 1606 and 1607 may be placed on the rotation axis of the toothed wheels 1610 and 1611. Also, the angle sensors 1606 and 1607 may be spaced apart and equally distanced from the symmetry center of both ring magnets 1603 and 1604.

Hence, in this embodiment, the sensor comprising the angle sensor elements 1606 and 1607 is mounted inside the stator 1605 (i.e. a sensor dome), which can also serve as a bearing for the two rotatable ring magnets 1603 and 1604 with opposing magnetizations (i.e. the force between the magnets brings them into opposite direction if one magnet is arranged freely rotatable and the other is fixed).

The ring magnets 1603 and 1604 may be mounted to the toothed wheels 1610 and 1611, which may in particular have identical outer diameter and number of teeth.

The angle sensor elements 1606 and 1607 can be assembled in one package. For example, the sensor elements 1606 and 1607 may be placed on opposing sides of the leadframe 1608.

As an alternative, the angle sensor elements 1606 and 1607 may be provided in separate packages, which could be mounted on opposing sides of a component board, which replaces the leadframe 1608, thereby defining their distance in axial direction (in relation to the rotation axis of the toothed wheels 1610 and 1611).

It is noted that the ring magnets 1603 and 1604 may not be rigidly attached to each other, but they may rotate synchronously due to the toothed wheels 1610 and 1611.

The stator 1605 may comprise Teflon or polyethylene or some technical plastic with sufficiently small friction. The ring magnets 1603 and 1604 and the toothed wheels 1610 and 1611 may comprise the same material (e.g., by plastic injection molding), in particular if the mechanical and friction properties of the magnet material are sufficient also for the toothed wheels 1610 and 1611. However, it is also an option that the ring magnets 1603 and 1604 and the toothed wheels 1610 and 1611 use different materials. They may be manufactured via a two-component injection molding process or they may be manufactured separately and glued together afterwards.

The inner diameter of the ring magnets 1603 and 1604 may be small (e.g. 0.5 mm), if the ring magnet 1603 turn above the angle sensor 1606 and the ring magnet 1604 turns below the angle sensor 1607.

Conversely, the inner diameter of the ring magnets 1603 and 1604 can also be large (e.g. 10 mm) so that the entire sensor package can be placed inside the bore.

The rotatable shaft 1601 can be a cam shaft of a combustion engine and the sensor module can be mounted at predetermined angles to the cam shaft. The sensor module may have an elongated shape at the end of which the two angle sensors 1606, 1607 and the two ring magnets 1603, 1604 with the toothed wheels 1610, 1611 are placed. Such a sensor module can require less than 10 mm space in axial direction, it can be made redundant, and robust against background interference magnetic fields.

Figure 17:
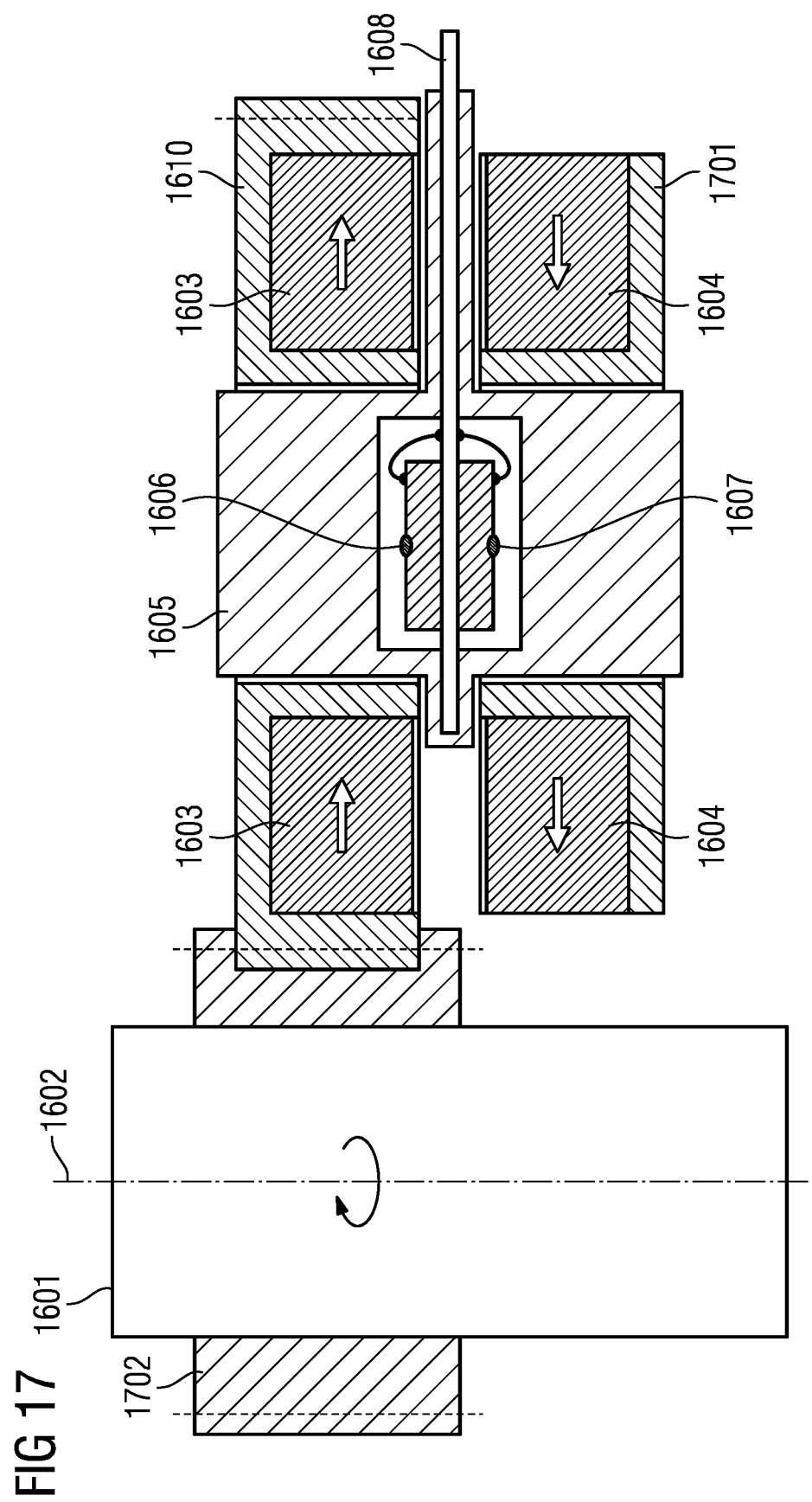
FIG. 17 shows a variation of FIG. 16, wherein the toothed wheel fixed to the shaft is engaged with only one toothed wheel comprising a ring magnet, wherein the additional ring magnet is moved via the magnetic force between the ring magnets.

FIG. 17 shows a variation of FIG. 16. The rotatable shaft 1601 is attached to a toothed wheel 1702, which is engaged with the toothed wheel 1610.

Instead of the toothed wheel 1611 shown in FIG. 16, FIG. 17 shows a support structure 1701 in which the ring magnet 1604 is embedded. The support structure 1701 does not have any teeth and it is not driven by the toothed wheel 1702.

Hence, the rings magnets 1603 and 1604 interact via a magnetic force which aligns their magnetization in anti-parallel direction. Therefore the toothed wheel 1702 does not need to drive both ring magnets 1603 and 1604. Instead, it is sufficient if the toothed wheel 1702 engages in the toothed wheel 1610 while the ring magnet 1604 has no toothed wheel at all. The ring magnet 1604 is driven by the magnetic force between the ring magnet 1603 and the ring magnet 1604.

FIG. 18 shows an exemplary diagram comprising two toothed wheels 1801 and 1803, which are coupled via a toothed wheel that is attached to a shaft (similar to the embodiment depicted in FIG. 16, wherein the toothed wheel 1801 is placed at the position of the toothed wheel 1610 and the toothed wheel 1803 is placed at the position of the toothed wheel 1611). The toothed wheel 1801 has an embedded magnet 1802 and the toothed wheel 1803 has an embedded magnet 1804. Arrows 1805 and 1806 visualize the direction of magnetization of the magnets 1802 and 1804.

With both magnets 1802 and 1804 being attached to the toothed wheels 1801 and 1803, which engage to the toothed wheel 1609 of the rotatable shaft, the diametrical magnetization in both magnets 1802, 1804 may be rotated slightly against the toothed wheels 1801, 1803: In the example depicted in FIG. 18, the magnetization 1805 of the magnet 1802 is aligned with the teeth of the toothed wheel 1801 and the magnetization 1806 of the magnet 1804 is aligned with the notches of the toothed wheel 1803.

In the assembled system, the magnets 1802 and 1804 are close together so that their magnetic forces interact; hence, the magnets 1802 and 1804 want to align in anti-parallel directions. In such scenario, the teeth of the toothed wheel 1801 faces the notches of the toothed wheel 1803. As both toothed wheels 1801, 1803 are engaged to the same tooth wheel 1609 on the shaft, this common tooth wheel 1609 forces the magnets 1802, 1804 in a position where the teeth of toothed wheels 1801, 1803 substantially align. However, the magnetizations 1805, 1806 of both magnets 1802, 1804 are not exactly anti-parallel ($\psi=180°$) but slightly deviate ($\psi=180°-\gamma$), wherein the angle $\gamma$ (see reference 1807) corresponds to half a pitch of a toothed wheel.

This means that the magnets 1802, 1804 have an attractive force towards anti-parallel alignment. Due to the mechanical coupling and the magnetic force the toothed wheels are preloaded, which counteracts any play or looseness in the gear mechanism. The stray field suppression does not suffer severely from the slight misalignment amounting to $\psi$.

The examples suggested herein may in particular be based on at least one of the following solutions. In particular combinations of the following features could be utilized in order to reach a desired result. The features of the method could be combined with any feature(s) of the device, apparatus or system or vice versa.

A magnetic angle sensor device is provided comprising
a shaft that is arranged rotatably around a rotation axis,
at least one permanent magnet,
a stator,
two magnetic angle sensors, which are fixed to the stator, wherein the shaft is arranged rotatably against the stator,
wherein the at least one permanent magnet is connected to the shaft,
wherein the at least one permanent magnet is arranged to apply magnetic fields at the two magnetic angle sensors with different directions of diametrical magnetic field components.

The magnetic field is a vector at each point. This vector can be decomposed into a vector parallel to the rotation axis and a vector orthogonal to the rotation axis. The latter is the diametrical magnetic field component.

If a chip is oriented with its major surface perpendicular to the rotation axis and magneto-resistive elements are sputtered to its major surface, these elements respond to diametrical magnetic field components. Conversely, if Hall plates are oriented perpendicular to the rotation axis they respond to the axial magnetic field component.

In practice the chip may be tilted by a few degrees due to assembly tolerances. If the major surface of a chip is not exactly perpendicular to the rotation axis, the magneto-resistive elements on its major surface respond mainly to the diametrical magnetic field component but also a little bit to the axial magnetic field component. As long as the normal to the major chip surface deviates by less than 10° from the direction of the rotation axis, the magneto-resistive elements still essentially see the diametrical magnetic field components and only negligible axial magnetic field components.

As an option, Vertical Hall effect devices may be used, because they also detect predominately the magnetic field components parallel to the major chip surface.

Hence, the solution presented is in particular robust against magnetic disturbance fields.

In an embodiment, the at least one permanent magnet is connected to the shaft via at least one toothed wheel.

In an embodiment,
the at least one permanent magnet is at least one ring magnet that is driven via the at least one toothed wheel and
the two magnetic angle sensors are located on a rotation axis of the at least one ring magnet or perpendicular to the rotation axis of the at least one ring magnet.

The two magnetic angle sensors may in particular be located on a straight line, which crosses the rotation axis, wherein the straight line is perpendicular to the rotation axis of the at least one ring magnet.

In an embodiment, the at least one permanent magnet comprises a first permanent magnet embedded in a first toothed wheel, which is engaged with a toothed wheel that is connected to the shaft.

In an embodiment, the at least one permanent magnet comprises a first permanent magnet embedded in a first toothed wheel and a second permanent magnet embedded in a second toothed wheel, wherein the first toothed wheel and the second toothed wheel are engaged with a toothed wheel that is connected to the shaft.

In an embodiment, the at least one permanent magnet is fixed to the shaft.

In an embodiment, the at least one permanent magnet comprises a single magnet that supplies different directions of diametrical magnetic field components on the two magnetic angle sensors.

In an embodiment,
the two magnetic angle sensors are on two different substrates,
a major surface of at least one substrate is perpendicular or substantially perpendicular to the rotation axis.

In an embodiment, the two substrates are located on the rotation axis of the shaft.

In an embodiment, the two substrates are attached to a single leadframe.

In an embodiment, the two magnetic angle sensors are on the same substrate and the major surface of this substrate is orthogonal or substantially orthogonal to the rotation axis of the shaft.

It is noted that the two magnetic angle sensors are on the same substrate and the major surface of this substrate may also be arranged parallel or substantially parallel to the rotation axis of the shaft. It is further noted that the substrate may be arranged at any angle between parallel and orthogonal to the rotation axis of the shaft.

In an embodiment, the two magnetic angle sensors are located at different axial positions on the rotation axis of the shaft.

In an embodiment, at least one of the two magnetic angle sensors comprises at least one out of the following group of sensor elements:
an anisotropic magneto-resistor (AMR),
a giant magneto-resistor (GMR),
a tunneling magneto-resistor (TMR),
a Vertical Hall effect device,
a Hall plate,
a MAG-FET.

It may be an advantage that the magnetic angle sensors may be of different technologies to increase the robustness and diversity of the system. For example, one of the angle sensors may be a TMR and the other may be an AMR or a Vertical Hall sensor. Using different technologies mitigates the risk that both angle sensors fail under severe conditions.

In an embodiment, the at least one permanent magnet is a ring magnet.

In an embodiment, the ring magnet is an axially magnetized quadrupole.

In an embodiment, the ring magnet is arranged such that its ring plane is perpendicular to the rotation axis and one of the two angle sensors is located to one side of the ring plane whereas the other angle sensor is located at the opposite side of the ring plane.

The ring plane is a plane of axial symmetry of the ring magnet.

In an embodiment, both angle sensors are mounted in or on a sensor dome, which protrudes into the hole of the ring magnet.

In an embodiment, the at least one permanent magnet provides diametrical magnetic field components on the two angle sensors, which differ by an angle between 90° and 270°, in particular close or equal to 180°.

In an embodiment, the at least one permanent magnet provides diametrical magnetic field components on the two angle sensors, whose magnitude differ by less than 5%, 10% or 20%.

In an embodiment, the at least one permanent magnet comprises at least two regions of magnetization with equal magnitude or substantially equal magnitude but opposite direction.

In an embodiment, the device further comprises a combining circuit,
  wherein each of the two magnetic angle sensors provides an output signal comprising an azimuthal angle of the diametrical magnetic field component that impacts the respective magnetic angle sensor,
  wherein the combining circuit is arranged to combine the output signals of the two magnetic angle sensors to a total output signal that determines a rotation of the shaft.

The rotation of the shaft may be a rotational position of the shaft, an angle, a change of an angle, a change of a position or the like.

In an embodiment, the combination of the output signals of the two magnetic angle sensors comprises a linear combination.

In an embodiment, the combining circuit is located on one of the substrates of the two magnetic angle sensors or on a separate substrate.

The combining circuit may be arranged on a separate substrate, e.g., a micro-processor.

A method is provided for determining a shaft rotation for a device comprising
  a shaft that is arranged rotatably around a rotation axis,
  at least one permanent magnet,
  a stator,
  two magnetic angle sensors, which are fixed to the stator,
  wherein the shaft is arranged rotatably against the stator,
  wherein the at least one permanent magnet is connected to the shaft,
  wherein the at least one permanent magnet is arranged to apply magnetic fields at the two magnetic angle sensors with different directions of diametrical magnetic field components,
  wherein the method comprises combining output signals of the two magnetic angle sensors to a total output signal that determines a rotation of the shaft, wherein each of the two magnetic angle sensors provides an output signal comprising an azimuthal angle of the diametrical magnetic field component that impacts the respective magnetic angle sensor.

Also, a computer program product is suggested that is directly loadable into a memory of a digital processing device, comprising software code portions for performing the steps of the method as described herein.

Further, a computer-readable medium is provided having computer-executable instructions adapted to cause a computer system to perform the steps of the methods described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. Magnetic angle sensor device comprising
a shaft that is arranged rotatably around a rotation axis,
at least one permanent magnet,
a stator,
two magnetic angle sensors, which are fixed to the stator,
wherein the shaft is arranged rotatably against the stator,
wherein the at least one permanent magnet is connected to the shaft,
wherein the at least one permanent magnet is arranged to apply magnetic fields at the two magnetic angle sensors with different directions of diametrical magnetic field components.

2. The device according to claim 1, wherein the at least one permanent magnet is connected to the shaft via at least one toothed wheel.

3. The device according to claim 2,
wherein the at least one permanent magnet is at least one ring magnet that is driven via the at least one toothed wheel and
wherein the two magnetic angle sensors are located on a rotation axis of the at least one ring magnet or perpendicular to the rotation axis of the at least one ring magnet.

4. The device according to claim 3, wherein the at least one permanent magnet comprises a first permanent magnet embedded in a first toothed wheel, which is engaged with a toothed wheel that is connected to the shaft.

5. The device according to claim 3, wherein the at least one permanent magnet comprises a first permanent magnet embedded in a first toothed wheel and a second permanent magnet embedded in a second toothed wheel, wherein the first toothed wheel and the second toothed wheel are engaged with a toothed wheel that is connected to the shaft.

6. The device according to claim 1, wherein the at least one permanent magnet is fixed to the shaft.

7. The device according to claim 1, wherein the at least one permanent magnet comprises a single magnet that supplies different directions of diametrical magnetic field components on the two magnetic angle sensors.

8. The device according to claim 1,
wherein the two magnetic angle sensors are on two different substrates,
wherein a major surface of at least one substrate is perpendicular or substantially perpendicular to the rotation axis.

9. The device according to claim 8, wherein the two substrates are located on the rotation axis of the shaft.

10. The device according to claim 8, wherein the two substrates are attached to a single leadframe.

11. The device according to claim 1, wherein the two magnetic angle sensors are on the same substrate and the major surface of this substrate is orthogonal or substantially orthogonal to the rotation axis of the shaft.

12. The device according to claim 1, wherein the two magnetic angle sensors are located at different axial positions on the rotation axis of the shaft.

13. The device according to claim 1, wherein at least one of the two magnetic angle sensors comprises at least one out of the following group of sensor elements:
an anisotropic magneto-resistor (AMR),
a giant magneto-resistor (GMR),
a tunneling magneto-resistor (TMR),
a Vertical Hall effect device,
a Hall plate,
a MAG-FET.

14. The device according to claim 1, wherein the at least one permanent magnet is a ring magnet.

15. The device according to claim 14, wherein the ring magnet is an axially magnetized quadrupole.

16. The device according to claim 14, wherein the ring magnet is arranged such that its ring plane is perpendicular to the rotation axis and one of the two angle sensors is located to one side of the ring plane whereas the other angle sensor is located at the opposite side of the ring plane.

17. The device according to claim 14, wherein both angle sensors are mounted in or on a sensor dome, which protrudes into the hole of the ring magnet.

18. The device according to claim 1, wherein the at least one permanent magnet provides diametrical magnetic field components on the two angle sensors, which differ by an angle between 90° and 270°, in particular close or equal to 180°.

19. The device according to claim 1, wherein the at least one permanent magnet provides diametrical magnetic field components on the two angle sensors, whose magnitude differ by less than 5%, 10% or 20%.

20. The device according to claim 1, wherein the at least one permanent magnet comprises at least two regions of magnetization with equal magnitude or substantially equal magnitude but opposite direction.

21. The device according to claim 1,
further comprising a combining circuit,
wherein each of the two magnetic angle sensors provides an output signal comprising an azimuthal angle of the diametrical magnetic field component that impacts the respective magnetic angle sensor,
wherein the combining circuit is arranged to combine the output signals of the two magnetic angle sensors to a total output signal that determines a rotation of the shaft.

22. The device according to claim 21, wherein the combination of the output signals of the two magnetic angle sensors comprises a linear combination.

23. The device according to claim 21, wherein the combining circuit is located on one of the substrates of the two magnetic angle sensors or on a separate substrate.

24. A method for determining a shaft rotation for a device comprising
a shaft that is arranged rotatably around a rotation axis,
at least one permanent magnet,
a stator,
two magnetic angle sensors, which are fixed to the stator,
wherein the shaft is arranged rotatably against the stator,
wherein the at least one permanent magnet is connected to the shaft,
wherein the at least one permanent magnet is arranged to apply magnetic fields at the two magnetic angle sensors with different directions of diametrical magnetic field components,
wherein the method comprises combining output signals of the two magnetic angle sensors to a total output signal that determines a rotation of the shaft, wherein each of the two magnetic angle sensors provides an output signal comprising an azimuthal angle of the diametrical magnetic field component that impacts the respective magnetic angle sensor.

25. A computer program product directly loadable into a memory of a digital processing device, comprising software code portions for performing the steps of the method according to claim 24.

26. A computer-readable medium having computer-executable instructions adapted to cause a computer system to perform the steps of the method according to claim 24.

* * * * *